(12) United States Patent
Chiba et al.

(10) Patent No.: US 11,880,278 B2
(45) Date of Patent: Jan. 23, 2024

(54) STORAGE SYSTEM AND STORAGE ADMINISTRATION METHOD

(71) Applicant: Hitachi, Ltd., Tokyo (JP)

(72) Inventors: Takeru Chiba, Tokyo (JP); Hiroki Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 100 days.

(21) Appl. No.: 17/690,290

(22) Filed: Mar. 9, 2022

(65) Prior Publication Data

US 2022/0365850 A1   Nov. 17, 2022

(30) Foreign Application Priority Data

May 13, 2021   (JP) ................. 2021-081799

(51) Int. Cl.
*G06F 11/10*   (2006.01)
*G06F 3/06*    (2006.01)

(52) U.S. Cl.
CPC ........ *G06F 11/1092* (2013.01); *G06F 3/0617* (2013.01); *G06F 3/0638* (2013.01); *G06F 3/0689* (2013.01)

(58) Field of Classification Search
CPC .... G06F 11/10; G06F 11/1092; G06F 3/0617; G06F 3/0638; G06F 3/0689
See application file for complete search history.

(56) References Cited

U.S. PATENT DOCUMENTS

| | | | | |
|---|---|---|---|---|
| 10,162,548 B2 * | 12/2018 | Robins | ............... | G06F 11/1088 |
| 10,310,752 B1 * | 6/2019 | Li | ............... | G06F 3/0689 |
| 11,150,820 B2 * | 10/2021 | Fujii | ............... | G06F 3/0631 |
| 2007/0130424 A1 * | 6/2007 | Hashimoto | ............... | G06F 3/0689 711/114 |
| 2013/0003211 A1 * | 1/2013 | Kawaguchi | ............... | G06F 11/1092 360/39 |
| 2015/0324145 A1 * | 11/2015 | Akutsu | ............... | G06F 3/0685 711/114 |
| 2015/0373105 A1 * | 12/2015 | Okada | ............... | G06F 3/067 709/219 |
| 2018/0081757 A1 * | 3/2018 | Chiba | ............... | G06F 3/0689 |
| 2020/0057563 A1 * | 2/2020 | Chiba | ............... | G06F 3/0665 |
| 2021/0181958 A1 * | 6/2021 | Fujii | ............... | G06F 3/0688 |
| 2022/0027070 A1 * | 1/2022 | Fujii | ............... | G06F 3/0646 |

FOREIGN PATENT DOCUMENTS

WO   2014/115320 A1   7/2014

* cited by examiner

*Primary Examiner* — Kamini B Patel
(74) *Attorney, Agent, or Firm* — Volpe Koenig

(57) ABSTRACT

It is made possible to pursue both higher speeds of rebuilds in the distributed RAID scheme and high availability due to acquisition of DE-failure tolerance. A virtual chunk includes k (k is an integer that is equal to or larger than two) virtual parcels including a virtual parcel having user data and a virtual parcel having element data that is redundant data for repairing the user data, the virtual parcels included in the same virtual chunk is stored by mapping the virtual parcels in storage areas of k mutually different physical storage drives among N (k<N) of the physical storage drives, and the maximum value of the numbers of the same virtual parcels to be mapped to the physical storage drives housed in the same drive enclosures is equal to or smaller than a predetermined value.

9 Claims, 33 Drawing Sheets

FIG.10

| Pool# | VPG# | ALLOCATABLE Vchunk COUNT | ALLOCATABLE VPG PAGE COUNT |
|---|---|---|---|
| 0 | 0 | 16 | 64 |
|  | ... | ... |  |
|  | 3 | 16 | 64 |
|  | 8 | 16 | 64 |
|  | ... | ... |  |
|  | 23 | 4 | 16 |
|  | 32 | 16 | 64 |
|  | ... | ... |  |
|  | 63 | 8 | 32 |
| 1 | 96 | 16 | 128 |
|  | ... | ... |  |
|  | 127 | 12 | 96 |

POOL ADMINISTRATION TABLE  802

FIG.11

| Pool# | VVOL# | VVOL Page# | VPG# | VPG Page# |
|---|---|---|---|---|
| 0 | 1 | 0 | 1 | 0 |
| | | 1 | 1 | 1 |
| | | 2 | 1 | 33 |
| | | 3 | UNALLOCATED | UNALLOCATED |
| | | ... | ... | ... |
| | 2 | 0 | 2 | 0 |
| | | 1 | 2 | 3 |
| | | ... | ... | ... |
| 1 | 3 | 0 | 3 | 2 |
| | 4 | 0 | 4 | 9 |

PAGE MAPPING TABLE   803

FIG. 12

| DPG# (1201) | cycle# (1202) | CYCLE MAP VERSION (1203) |
|---|---|---|
| 0 | 0 | Target |
|   | 1 | Target |
|   | 2 | Changing |
|   | 3 | Current |
|   | 4 | Current |
|   | 5 | Current |
| 1 | 0 | Target |
|   | 1 | Target |
|   | 2 | Changing |
|   | 3 | Current |
|   | 4 | Current |
|   | 5 | Current |
| 2 | 0 | Current |
|   | 1 | Current |
|   | 2 | Current |

MAP POINTER TABLE 804

FIG.15A

| VPG# (1501) | DPG# (1502) |
|---|---|
| 0 | 0 |
| 1 | 0 |
| 2 | 0 |
| 3 | 0 |
| 4 | 0 |
| 5 | 0 |
| 6 | 1 |

PG MAPPING (V2P) TABLE 807

FIG.15B

| DPG# (1504) | VPG# (1503) |
|---|---|
| 0 | 0 |
|  | 1 |
|  | 2 |
|  | 3 |
|  | 4 |
|  | 5 |
| 1 | 6 |
|  | 7 |
|  | 8 |
|  | 9 |
|  | 10 |
|  | 11 |
| 2 | 20 |
|  | 22 |
|  | 25 |

PG MAPPING (P2V) TABLE 808

FIG.16

| DE# (1601) | PDEV# (1602) |
|---|---|
| 0 | 0 |
| 0 | 1 |
| 0 | 2 |
| 1 | 3 |
| 1 | 4 |
| 2 | 5 |
| 2 | 6 |

DRIVE ENCLOSURE ADMINISTRATION TABLE 809

(P1) MAPPING BEFORE ADDITION OF PLURALITY OF DRIVES (INITIAL STATE)

(P2) EXISTING PARCEL REARRANGEMENT PROCESS (P3) MAPPING AFTER DRIVE ADDITION (P2) EXISTING PARCEL REARRANGEMENT PROCESS (P3) MAPPING AFTER DRIVE ADDITION (P1) MAPPING BEFORE ADDITION OF PLURALITY OF DRIVES (INITIAL STATE)

(P2) EXISTING PARCEL REARRANGEMENT PROCESS (P3) MAPPING AFTER ADDITION OF TWO DRIVES

STOP SYSTEM, AND REPLACE PHYSICAL STORAGE DRIVE

ADDITION+DATA MIGRATION

STORAGE SYSTEM AND STORAGE ADMINISTRATION METHOD

BACKGROUND OF THE INVENTION

1. Field of the Invention

The present invention relates to a storage system and a storage administration method.

2. Description of the Related Art

There are known storage systems that configure a redundant array of inexpensive (or independent) disks (RAID) group by using a plurality of storage devices and that provide a logical volume created on the basis of the RAID group to a superordinate device (e.g. a host computer).

As a technology related to RAID, WO 2014/115320 (referred to as Patent Document 1) discloses a technology, a generally called distributed RAID scheme, in which stripe rows including normal data and redundant data for recovering the normal data are administered, being distributed to a plurality of storage devices that provide storage areas to a capacity pool.

SUMMARY OF THE INVENTION

Storage systems that are required to have high availability have, in some cases, a configuration in which drives to be included in a RAID group are arranged in a distributed manner to a prescribed number of drive enclosures (DE) or more to thereby prevent data loss even in a case in which it becomes not possible to simultaneously access a plurality of drives in a DE for such reasons as a failure of the power supply of the DE, that is, a DE-failure tolerant configuration.

Patent Document 1 discloses a scheme for speeding up recovery at a time of a drive failure according to the distributed RAID scheme, but does not disclose a method for attaining DE-failure tolerance.

The present invention has been made in view of the circumstances described above, and an object of the present invention is to provide a storage system and a storage administration method that can pursue both higher speeds of rebuilds in the distributed RAID scheme and high availability enabled by acquisition of DE-failure tolerance.

A storage system according to one aspect of the present invention includes: a processor; and a plurality of physical storage drives housed in drive enclosures, in which the processor configures a virtual chunk with k (k is an integer equal to or larger than two) virtual parcels including a virtual parcel having user data and a virtual parcel having element data that is redundant data for repairing the user data, and stores the virtual parcels included in the same virtual chunk by mapping the virtual parcels in storage areas of k of the mutually different physical storage drives among N (k<N) of the physical storage drives, and a maximum value of the numbers of virtual parcels in the same virtual chunk to be mapped to the physical storage drives housed in the same drive enclosures is equal to or smaller than a predetermined value.

According to the present invention, it is possible to realize a storage system and a storage administration method that can pursue both higher speeds of rebuilds in the distributed RAID scheme and high availability enabled by acquisition of DE-failure tolerance.

BRIEF DESCRIPTION OF THE DRAWINGS

FIG. 10 is a figure depicting an example of a pool administration table in FIG. 8;

FIG. 11 is a figure depicting an example of a page mapping table in FIG. 8;

FIG. 12 is a figure depicting an example of a map pointer table in FIG. 8;

FIG. 15A is a figure depicting an example of a PG mapping table in FIG. 8;

FIG. 15B is a figure depicting an example of a PG mapping reverse translation table in FIG. 8;

FIG. 16 is a figure depicting an example of a drive enclosure administration table in FIG. 8;

DESCRIPTION OF THE PREFERRED EMBODIMENTS

Several embodiments are explained below with reference to the figures.

Note that, whereas various types of information are explained by using the expression "aaa table" in some cases in the explanation below, the various types of information may be expressed in a data structure other than tables. In order to make it clear that the various types of information do not depend on data structures, the "aaa table" can also be called "aaa information."

In addition, whereas processes are explained by using "programs" as the subjects of the processes in some cases in the explanation below, the processes may be explained by using the programs as the subjects of the processes because the programs perform specified processes while using storage resources (e.g. memories) and/or communication interface devices (e.g. ports) as appropriate by being executed by a processor (e.g. a central processing unit (CPU)). The processes explained by using the programs as the subjects of the processes may be processes to be performed by processors or computers (e.g. an administration computer, host computers, controllers, or the like) having the processors. In addition, controllers (storage controllers) may be processors themselves, and may include hardware circuits that perform some or all of processes performed by the controllers. Programs may be installed on each controller from a program source. For example, the program source may be a program distribution server or a computer readable storage medium.

In addition, whereas identifications (IDs) are used as identification information of elements in the explanation below, different types of identification information may be used instead of or in addition to the IDs.

In addition, in a case in which elements of the same type are explained without making a distinction from one another in the explanation below, reference signs or common numbers in the reference signs are used, and, in a case in which the elements of the same type are explained with distinction among the elements of the same type being made, reference signs of the elements are used or IDs allocated to the elements are used instead of the reference signs, in some cases.

In addition, input/output (I/O) requests are write requests or read requests in the explanation below, and may be called access requests.

A RAID group may be called a parity group (PG).

A storage system according to the present embodiments has configurations like the ones mentioned below as an example.

That is, a map creation scheme in which a RAID width k is translated into a space with N drives where k N is satisfied, and a logical structure to which mapping is applied are disclosed in the storage system according to the present embodiments. In the mapping creation, a DE-failure tolerant mapping is created according to a relation between the N drives and DEs in which the N drives are stored.

First Embodiment

Figure 1:
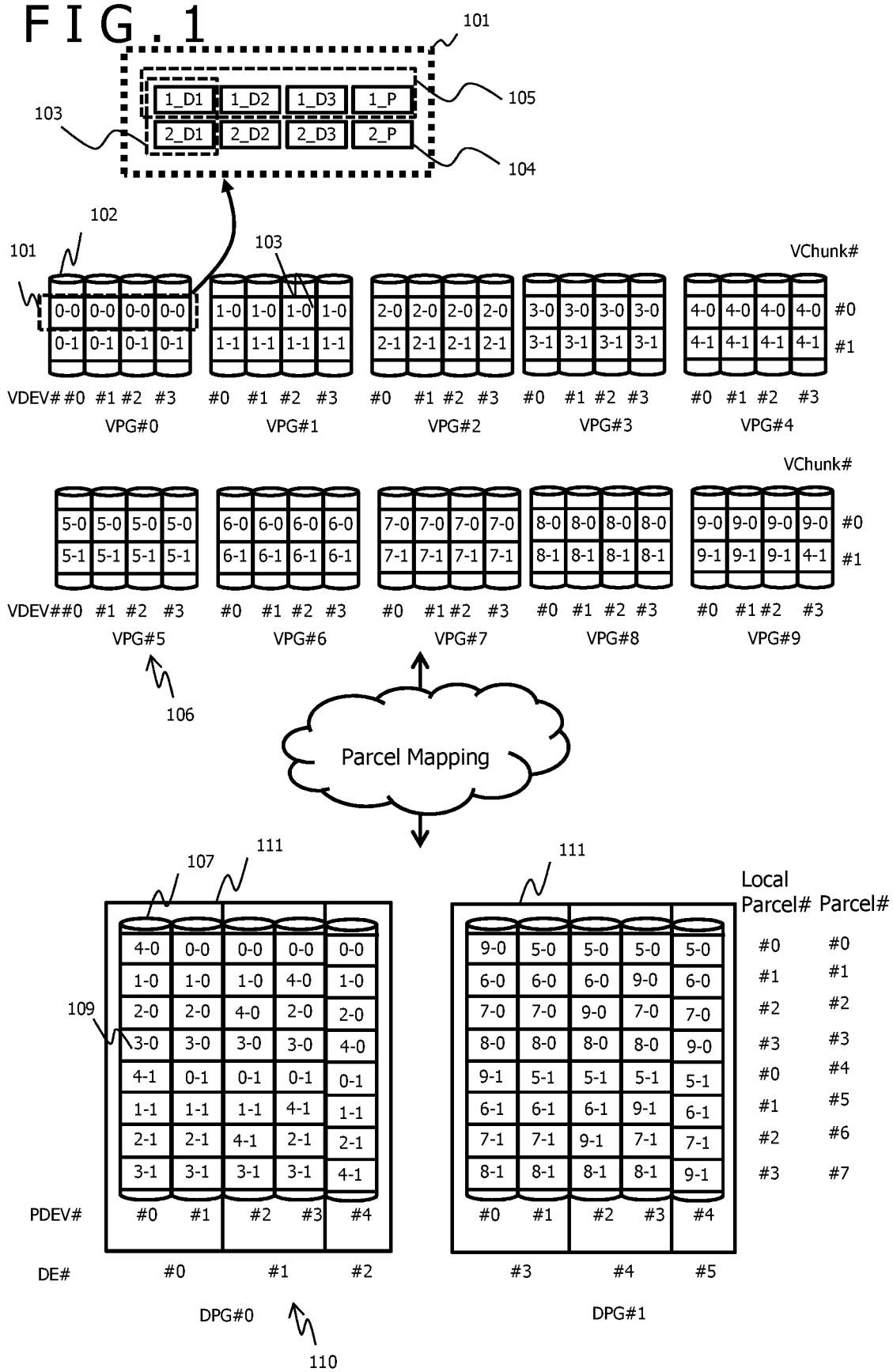
FIG. 1 is a block diagram depicting an example of parcel mapping between virtual storage areas and physical storage areas administered in a storage system according to a first embodiment.

FIG. 1 depicts an overview of mapping between virtual storage areas and physical storage areas in a computer system (storage system) according to a first embodiment.

The upper section of this figure depicts virtual storage areas, and the lower section of this figure depicts physical storage areas.

The computer system according to the present embodiment provides a virtual volume to a host and allocates virtual storage areas provided by virtual storage drives (Virtual DEVices: VDEVs) 102 to the virtual volume. In the example in this figure, 40 virtual storage drives 102 are depicted, and each virtual storage drive 102 is given VDEV# (number). The virtual storage areas are pages, for example.

Furthermore, virtual parity groups (Virtual Parity Groups: VPGs) 106 each including a plurality of virtual storage drives 102 are configured. In the example in this figure, one virtual parity group 106 includes four virtual storage drives 102. In the example in this figure, ten virtual parity groups 106 are depicted, and each virtual parity group 106 is given VPG# (number). In addition, each drive belonging to a virtual parity group 106 is given VDEV# representing its position in the virtual parity group. In the example in this figure, four virtual storage drives 102 are depicted in each virtual parity group 106, and are given mutually different VDEV#.

Each virtual parity group 106 is a redundant array of inexpensive disks (RAID) group and stores a redundant dataset that is arranged in a distributed manner in a plurality of virtual storage drives 102. The redundant dataset is a dataset for rebuilding data in RAID and includes data from a host and redundant data.

The virtual storage areas are divided into virtual stripes 104 with predetermined sizes. A virtual stripe row 105 includes virtual stripes 104 with particular logical addresses in a plurality of virtual storage drives 102 in a virtual parity group 106. In the example in this figure, one virtual stripe row 105 includes four virtual stripes 104. The virtual stripe row 105 stores a redundant dataset. The redundant dataset includes data D from a host and a parity P based on the data D. Each virtual stripe 104 in one virtual stripe row 105 stores data D or a parity P in a corresponding redundant dataset.

Note that data D is called user data, in some cases. Parities P are called redundant data, in some cases. Data stored in each virtual stripe in a redundant dataset is called element data, in some cases.

In one virtual storage drive 102, one virtual parcel 103 includes one virtual stripe 104 or a predetermined number of virtual stripes 104 having consecutive logical addresses. In the example in this figure, one virtual parcel 103 includes two virtual stripes 104 having consecutive logical addresses.

Moreover, a virtual chunk (Virtual chunk: Vchunk) 101 includes a predetermined number of virtual stripe rows 105 having consecutive logical addresses. Each virtual chunk 101 is one virtual parcel row. A virtual parcel row includes virtual parcels 103 with particular logical addresses in a plurality of virtual storage drives 102 in one virtual parity group 106. In other words, one virtual chunk 101 includes one or more virtual stripe rows 105 having consecutive logical addresses. In the example in this figure, one virtual chunk 101 includes two virtual stripe rows 105 having consecutive logical addresses. In the example in this figure, 20 virtual chunks 101 are depicted, and each virtual chunk 101 is given Vchunk# in a VPG 106. In a case in which a virtual parcel 103 includes one virtual stripe 104, the virtual chunk 101 includes one virtual stripe row 105.

In the example in this figure, a pair of numbers written in each virtual parcel 103 is a Vchunk identifier represented by VPG# and Vchunk#. For example, if a virtual parcel 103 has a Vchunk identifier "0-1," this represents that the virtual parcel 103 belongs to VPG#=0 and Vchunk#=1.

The virtual storage areas are mapped to the physical storage areas provided by physical storage drives (Physical DEVices: PDEVs) 107. In the example in this figure, ten physical storage drives 107 are depicted, and each physical storage drive is given PDEV#. Distributed Parity groups (Distributed Parity Groups: DPGs) 110 each including a plurality of physical storage drives 107 are configured. In the example in this figure, one distributed Parity group 110 includes five physical storage drives 107. In the example in this figure, two distributed Parity groups 110 are depicted, and each distributed Parity group 110 is given DPG#. Mapping between virtual storage areas and physical storage areas is called parcel mapping, in some cases. In addition, physical storage drives 107 belonging to each distributed Parity group 110 are given Physical DEVice (PDEV) # representing their positions in the distributed Parity group. In the example in this figure, five physical storage drives 107 are depicted in each distributed Parity group 110 and are given mutually different PDEV#.

At least one physical storage drive 107 in the plurality of physical storage drives 107 is housed in a drive enclosure (DE) 111. It should be noted that there may be cases that any physical storage drives 107 are not housed in drive enclosures 111. In the example in this figure, six drive enclosures are depicted, and each drive enclosure is given DE#. Note that a relation between the physical storage drives 107 and the drive enclosures 111 in FIG. 1 is merely an example and is not an essential arrangement relation in the present embodiment. For example, physical storage drives 107 included in two distributed Parity groups 110 in the example in this figure may be housed in a common drive enclosure 111.

Each virtual parcel 103 in virtual chunks 101 is mapped to a physical parcel 109 in the physical storage areas. The numbers in each physical parcel 109 represent a Vchunk identifier (VPG# and Vchunk#) to which the corresponding virtual parcel 103 belongs. In the example in this figure, five physical parcels 109 are depicted for each PDEV, and each physical parcel 109 is given Parcel#. Each physical parcel 109 is identified by Parcel#, PDEV#, and DPG#.

In the example in this figure, a plurality of virtual parcels 103 in a virtual chunk 101 are mapped to a plurality of mutually different physical storage drives 107 in preparation for failure recovery. In other words, a plurality of virtual stripes 104 in a virtual stripe row 105 also are mapped to a plurality of mutually different physical storage drives 107. Thereby, a redundant dataset includes element data (data D or a parity P), the number of pieces of the element data is equal to a physical storage drive count of a distributed Parity group, the element data is written in physical storage drives 107, and the number of the physical storage drives 107 is equal to the physical storage drive count of the distributed Parity group.

Parcel mapping satisfies a mapping condition. The mapping condition is that each virtual chunk 101 is mapped to a plurality of physical storage drives 107. In other words, the mapping condition is that a plurality of physical parcels 109 in one physical storage drive 107 are not mapped to the same virtual chunk 101, and moreover, physical parcels 109 located in a given drive enclosure 111 are not mapped to the same virtual chunk 101 in an amount equal to or larger than a prescribed number.

The computer system according to the first embodiment is explained below.

Figure 2:
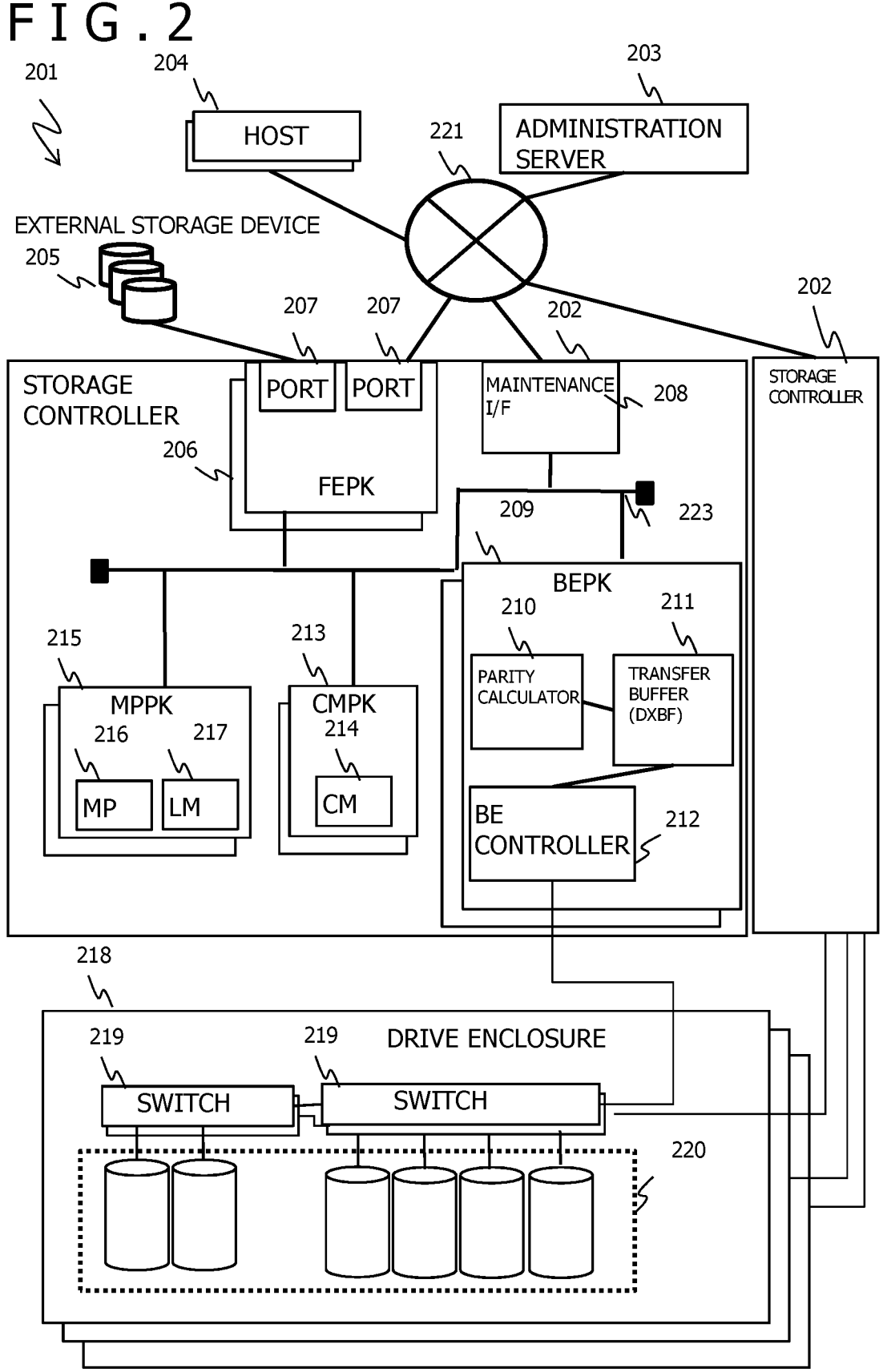
FIG. 2 is a block diagram depicting a hardware configuration example of a computer system to which the storage system according to the first embodiment is applied.

FIG. 2 depicts the hardware configuration of the computer system according to the present embodiment.

A computer system 201 includes one or more host computers (called hosts below) 204, an administration server 203, storage controllers 202, and drive enclosures 218. The hosts 204, the administration server 203 and the storage controllers 202 are connected via a network 221. The drive enclosures 218 are connected with the storage controllers 202. The network 221 may be a local area network (Local Area Network: LAN) or may be a wide area network (Wide Area Network: WAN). A host 204 and a storage controller 202 may be one computer. In addition, each of the hosts 204 and the storage controllers 202 may be a virtual machine.

For example, the hosts 204 are computers that execute applications. The hosts 204 read out data to be used by the applications from the storage controllers 202 and write data created by the applications into the storage controllers 202.

The administration server 203 is a computer to be used by an administrator. The administration server 203 may include an input device used for inputting information, and an output device used for displaying information. In response to operation on the input device by the administrator, the administration server 203 accepts settings regarding a type of a data recovery process for recovery of data and performs setting such that a storage controller 202 executes the accepted data recovery process.

For example, the storage system includes the storage controllers 202, and the one or more drive enclosures 218. The drive enclosure 218 includes a plurality of physical storage drives 107 (also called drives, simply). For example, the physical storage drives 107 are physical storage drives such as magnetic discs, flash memories, or other non-volatile semiconductor memories (PRAMS, ReRAMs, etc.).

Each storage controller 202 has one or more front-end packages (FrontEnd PacKages: FEPK) 206, a maintenance interface (maintenance I/F) 208, one or more micro processor packages (MPPKs) 215, one or more cache memory packages (CM PacKages: CMPKs) 213, one or more back-end packages (BackEnd PacKages: BEPKs) 209, and an internal network 223.

The FEPKs 206, the maintenance I/F 208, the MPPKs 120, the CMPKs 213, and the BEPKs 209 are connected via the internal network 223. The BEPKs 209 are connected with drive enclosures 218 via a plurality of lines of paths.

The FEPKs 206 are an example of interfaces with the hosts 204, and each FEPK 206 has one or more ports 207. The ports 207 connect the storage controller 202 with various devices via the network 221 or the like. The maintenance I/F 208 is an interface for connecting the storage controller 202 with the administration server 203.

The MPPKs 215 are control sections, and each MPPK 215 has one or more micro processors (Micro Processors: MP) 216 and a local memory (Local Memory: LM) 217. The MPs 216 execute programs stored on the LM 217 and execute various types of processing. The MPs 216 transmit, via the BEPKs 209, various types of command (e.g. READ commands, WRITE commands, and the like in SCSI) to physical storage drives 107 in the drive enclosures 218. The LM 217 stores various types of program and various types of information.

Each CMPK 213 has one or more cache memories (CMs) 214. The CMs 214 temporarily store data (write data) to be written into physical storage drives 107 from the hosts 204, and data (read data) read out from the physical storage drives 107.

The BEPKs 209 are an example of interfaces with the drive enclosures 218, and have one or more ports 207.

Each drive enclosure 218 has a plurality of physical storage drives 107. Each physical storage drive 107 includes one or more storage media. For example, the storage media are magnetic discs, flash memories, or other non-volatile semiconductor memories (PRAMS, ReRAMs, or the like).

The storage controllers 202 administer capacity pools (called pools below, simply) including storage areas of a plurality of physical storage drives 107. The storage controllers 202 configure RAID groups by using the storage areas in the pools. That is, the storage controllers 202 configure a plurality of virtual parity groups (VPG) by using a plurality of physical storage drives 107. The VPGs are virtual RAID groups.

The storage area of a VPG includes a plurality of sub-storage area rows. Each sub-storage area row includes a plurality of sub-storage areas. The plurality of sub-storage areas are arranged in a distributed manner in a plurality of physical storage drives 107 included in the VPG, and each sub-storage area corresponds to one of the plurality of physical storage drives 107. Here, one sub-storage area is called a "stripe," and a sub-storage area row is called a "stripe row." The storage area of a RAID group includes a plurality of stripe rows.

There are several levels (called "RAID levels" below) in RAID. For example, in RAID 5, write-target data specified by a host computer supporting RAID 5 is divided into pieces of data (called "data units" below, for convenience) each with a predetermined size. Each data unit is divided into a plurality of data elements. Each of the plurality of data elements is written into one of a plurality of stripes in the same stripe row.

In RAID 5, an occurrence of a failure in a physical storage drive 107 triggers generation of redundant information (a "redundant code" below) called a "parity" for each data unit for rebuilding data elements that have become unreadable from the physical storage drive 107. The redundant code also is written in a stripe in the same stripe row as the plurality of data elements.

For example, in a case in which the number of physical storage drives 107 included in a RAID group is four, three data elements included in a data unit are written in three stripes corresponding to three physical storage drives 107 among the four physical storage drives 107, and a redundant code is written in a stripe corresponding to the remaining one physical storage drive 107. In a case in which a distinction is not made between data elements and redundant codes below, both are called stripe data elements, in some cases.

In RAID 6, two types of redundant code (called a P parity and a Q parity) are generated for each data unit, and the respective redundant codes are written in stripes in the same stripe row. Thereby, in a case in which two data elements in a plurality of data elements included in a data unit cannot be read out, these two data elements can be recovered.

There are RAID levels (e.g. RAID 1 to 4) other than those explained in the description above. As data redundancy technologies, there are also triple mirror (Triplication), the triple parity technology that uses three parities and the like. Regarding redundant-code generation technologies also, there are various technologies such as Reed-Solomon encoding that uses Galois calculations or EVEN-ODD. Whereas RAID 5 or 6 is explained mainly below, the redundancy technology can be replaced with the methods mentioned above.

In a case in which any physical storage drive 107 of physical storage drives 107 has malfunctioned, a storage controller 202 recovers data elements stored on the malfunctioning physical storage drive 107.

An MP 216 in an MPPK 215 acquires stripe data elements (e.g. other data elements and parities) necessary for recovering the data elements having been stored on the malfunctioning physical storage drive 107 from a plurality of physical storage drives 107 storing the data. The MP 216 stores the acquired stripe data elements in a cache memory (Cache Memory: CM) 214 via an interface device (e.g. a BEPK 209). Thereafter, the data elements are recovered on the basis of the stripe data elements on the cache memory 214, and the data elements are stored on a predetermined physical storage drive 107.

For example, for a data unit in a RAID group configured in RAID 5, the MP 216 generates a P parity according to exclusive OR (XOR) of a plurality of data elements included in the data unit. For a data unit in a RAID group configured in RAID 6, the MP 216 further multiplies a plurality of data elements included in the data unit by a predetermined coefficient, and then generates a Q parity according to exclusive OR of the respective pieces of data.

Operation of an MP 216 is explained as operation of the storage controller 202 in some cases below.

Figure 3:
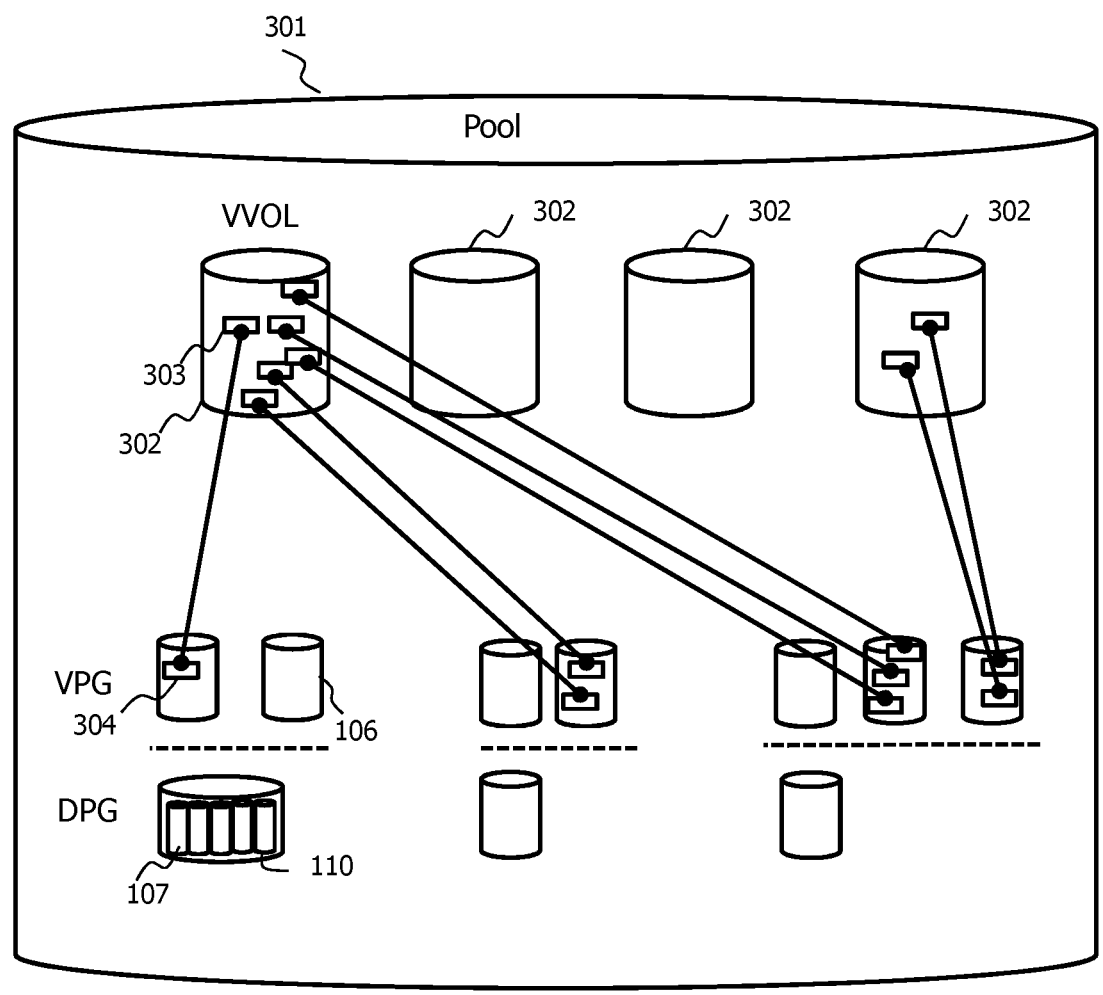
FIG. 3 is a block diagram depicting a configuration example of a capacity pool administered in the storage system in FIG. 2.

FIG. 3 depicts a logical configuration of the computer system according to the present embodiment.

A storage controller 202 configures a distributed Parity group (DPG) 110 by bundling a plurality of physical storage drives 107, for example, five physical storage drives 107. The storage controller 202 configures one or more distributed Parity groups 110, and one or more virtual parity groups (VPG) 106 corresponding to the one or more distributed Parity groups 110. The storage controller 202 allocates partial storage areas of the DPGs 110 to the VPGs 106.

There are a plurality of virtual volumes (Virtual VOLumes: VVOLs) 302 in a pool 301. The VVOLs 302 are virtual storage devices and can be referred to by hosts 204. In accordance with an instruction from an administrator of the storage controller 202, the administration server 203 causes, via the maintenance I/F 208, the storage controller 202 to create a VVOL 302 with a given size. The size does not depend on the actual total capacity of physical storage drives 107. The storage controller 202 dynamically allocates a storage area (VPG page 304) in a VPG to a storage area (VVOL page 303) in the VVOL 302 represented by an I/O request (host I/O) from a host 204.

Figure 4:
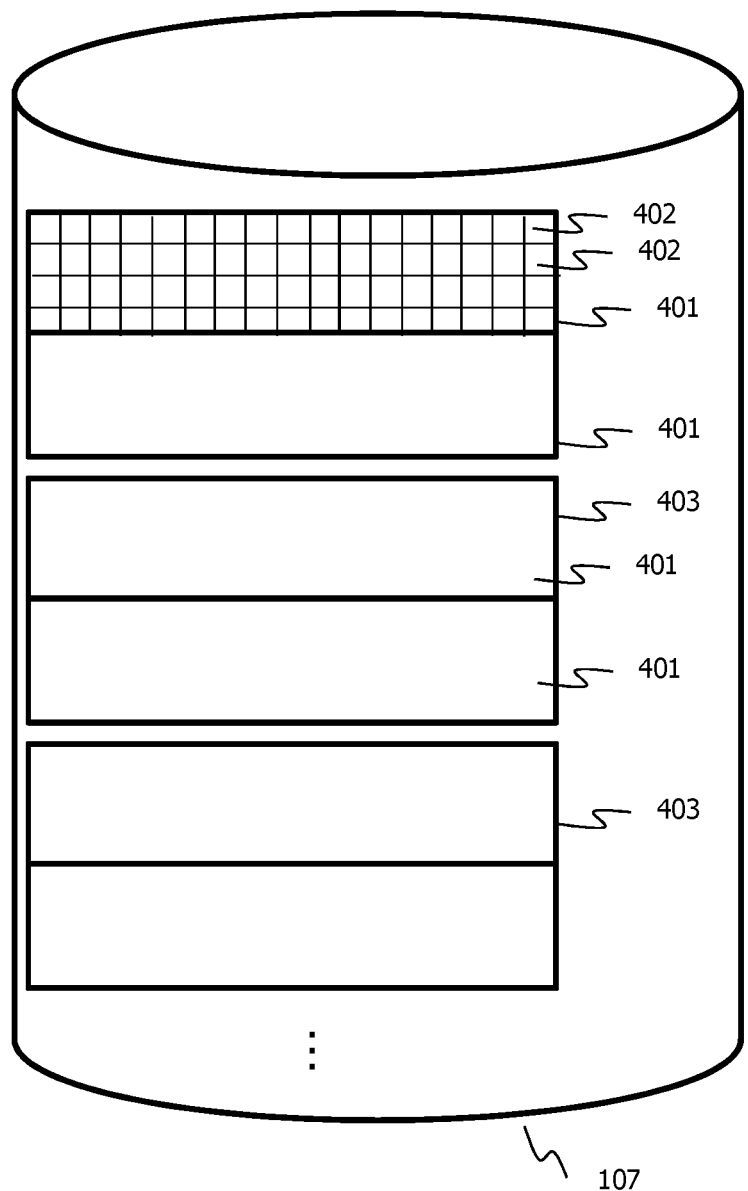
FIG. 4 is a block diagram depicting an example of the data configuration of a physical storage drive used in the storage system in FIG. 2.

FIG. 4 depicts a data configuration of a physical storage drive.

The physical storage drive 107 performs, with superordinate devices such as storage controllers 202, data exchange in units of sub-blocks 402 which are the minimum units (e.g. 512 Bytes) of SCSI command processes. Slots 401 are administration units in which data is cached on cache memories 214 and have sizes of 256 KB, for example. Each slot 401 includes a set of a plurality of consecutive sub-blocks 402. Each physical stripe 403 stores a plurality of slots 401 (e.g. two slots 401).

Figure 5:
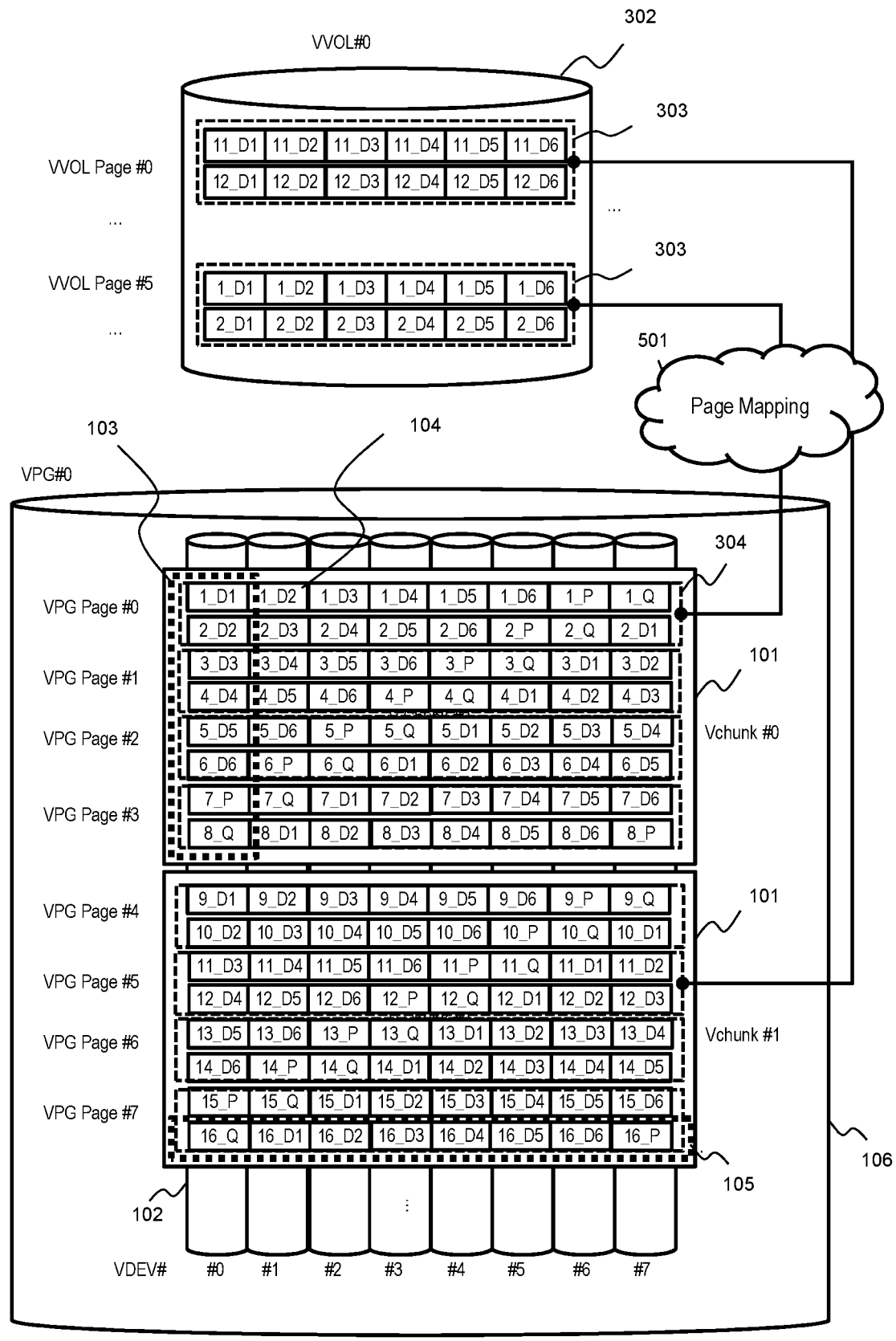
FIG. 5 is a block diagram depicting an example of page mapping of a virtual volume administered in the storage system in FIG. 2.

FIG. 5 depicts page mapping of a virtual volume.

A VVOL 302 that can be recognized by a host 204 includes a plurality of VVOL pages 303. The VVOL 302 has a unique identifier (VVOL number). A storage controller 202 allocates VPG pages 304 in a VPG 106 to the VVOL pages 303. This relation is called page mapping 501. The page mapping 501 is administered dynamically by the storage controller 202. A plurality of VVOL pages having consecutive VVOL page# are given consecutive VVOL-space addresses.

The VPG 106 includes one or more virtual chunks (Vchunks) 101. Each Vchunk 101 includes a plurality of virtual parcels 103. In the example in this figure, each Vchunk 101 includes eight virtual parcels 103.

Each virtual parcel 103 includes consecutive areas in one virtual storage drive 102. The virtual parcel 103 includes one or more virtual stripes 104. In the example in this figure, the virtual parcel 103 includes eight virtual stripes 104. The number of virtual stripes 104 in the virtual parcel 103 are not limited particularly. Because the virtual parcel 103 includes a plurality of virtual stripes 104, higher process efficiency is realized.

In the example in this figure, the VPG 106 has a 6D+2P configuration in RAID 6. That is, six data elements (D) included in a data unit, and two parities (P and Q) corresponding to the data elements are stored on physical storage drives 107 in mutually different drive enclosures 111. In this case, each Vchunk 101 includes virtual parcels 103 in eight different physical storage drives 107, for example.

In other words, each Vchunk 101 includes a plurality of virtual stripe rows 105, and, in the example in this figure, includes eight virtual stripe rows 105. Because each Vchunk 101 includes a plurality of virtual stripe rows 105, higher process efficiency is realized. Note that each Vchunk 101 may include one virtual stripe row 105.

Each Vchunk 101 includes a plurality of VPG pages 304 (e.g. four VPG pages 304). Each VPG page 304 can store stripe data elements of a plurality of consecutive virtual stripe rows 105 (e.g. two consecutive virtual stripe rows 105). For example, by setting the capacities of the plurality of data units to several MBs, the sequential performance of a host I/O can be kept constant even in a case in which the physical storage drives 107 are magnetic discs or the like.

In this figure, like 1_D1, 1_D2, 1_D3, 1_D4, 1_D5, 1_D6, 1_P, and 1_Q, ones having a common number before " " represent stripe data elements of the same virtual stripe row 105. Note that the size of each stripe data element is the size of a physical stripe 403.

The VPG 106 has a unique identifier (VPG number) in the superordinate storage system. In addition, each of K virtual storage drives 102 in each VPG 106 is given a drive number (VDEV number). This is an identifier for addressing of a storage area in the VPG 106, and is an identifier for representing a correspondence relation with a drive (PDEV) in a DPG 110 mentioned later. K is called a VPG drive count, in some cases.

Each VVOL 302 is accessed by a host 204 by using an identifier representing the VVOL 302, and an LBA. As depicted in this figure, the VVOL pages 303 are given VVOLPage# starting from the beginning of the VVOL 302. For an LBA specified by a host I/O, VVOLPage# can be calculated according to the following formula. Here, Floor (x) is a symbol representing the maximum integer equal to or smaller than a real number x. Each of the LBA and VVOLPagesize may be represented by a sub-block count.

$$VVOLPage\#=Floor(LBA/VVOLPagesize)$$

In addition, each of the VVOL pages 303 and VPG pages 304 includes a plurality of virtual stripes. It should be noted that, in order to not allow a host 204 to access data of parities, the parities are not visible on the VVOL 302. For example, in the case of 6D+2P depicted in this figure, a VPG page 304 including 8×2 virtual stripes in the space of the VPG 106 are visible as a VVOL page 303 including 6×2 virtual stripes in the space of the VVOL 302.

By correcting the space of the VPG 106 and the space of the VVOL 302, the storage controller 202 can calculate VDEV# and Vchunk# in VPG# corresponding to an LBA on the VVOL-302 side, and the offset address in a virtual parcel 103, by using the page mapping 501 in combination. Certainly, the storage controller 202 also can calculate VDEV# and Vchunk# in VPG# of a parity area corresponding to a host I/O, and the offset address in a virtual parcel 103.

Whereas this figure depicts a case in which RAID 6 (6D+2P) is used, the number of D may be increased to realize 14D+2P or the like, or RAID 5 or RAID 1 may be used, for example. In addition, virtual parcels including only parities may be created, as in RAID 4. While there is a merit that the logical design on the superordinate layer can be simplified in the case of typical RAID 4, there is a demerit that access to parity drives is concentrated at a time of Write, and so the parity drives cause bottlenecks easily. However, in the case of a distributed RAID configuration, data in parity drives on a VPG 106 are distributed to a plurality of physical storage drives 107 on a DPG 110, and so the influence of the demerit can be minimized. In addition, encoding of Q parities in RAID 6 may be performed according to one other than Galois calculation or another typically known method such as the EVEN-ODD method may be used.

Figure 6:
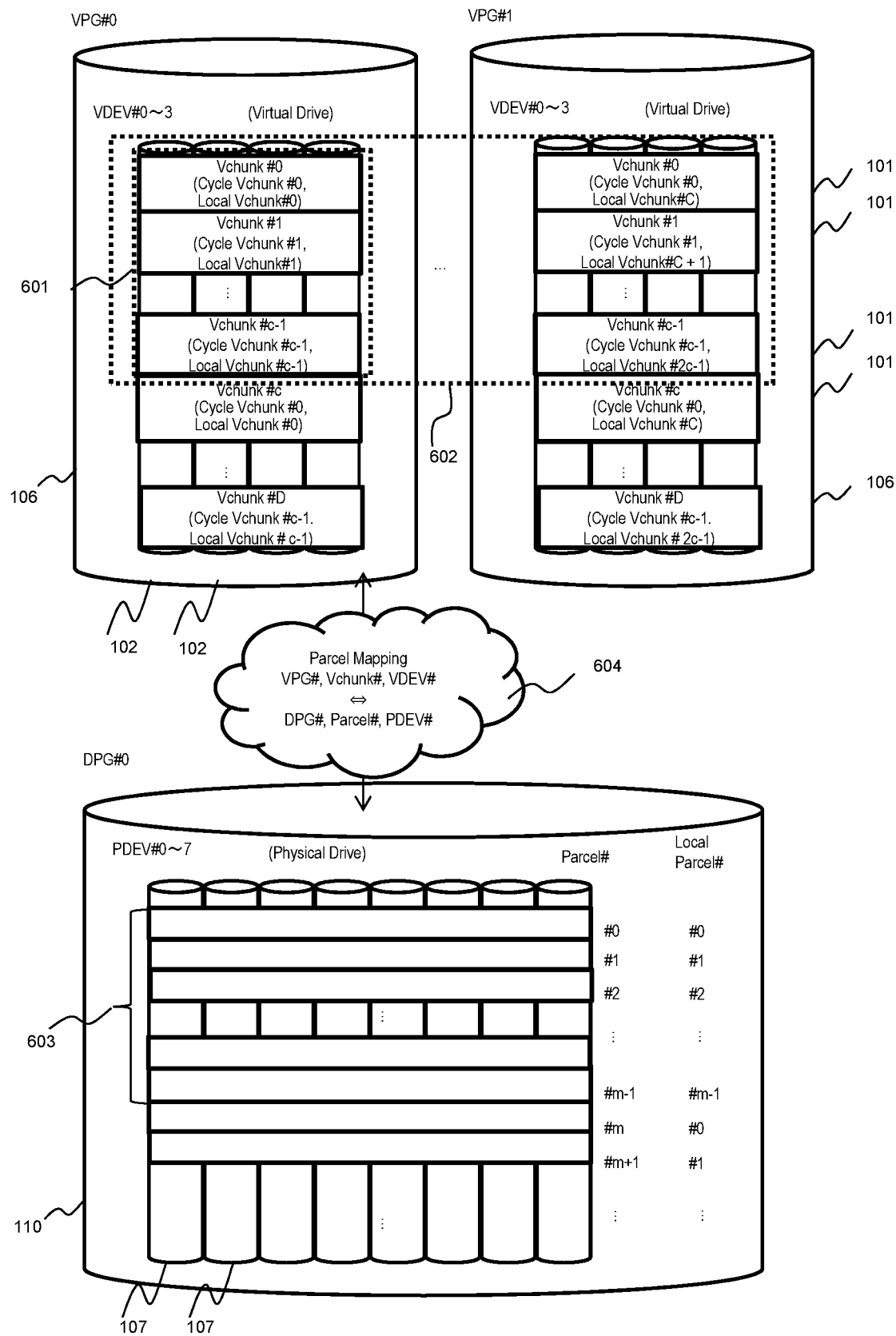
FIG. 6 is a block diagram depicting an example of parcel mapping between virtual parity groups and a distributed parity group administered in the storage system in FIG. 2.

FIG. 6 depicts parcel mapping between VPGs and a DPG.

Vchunks 101 are consecutive in the space of the storage area of a VPG 106 as mentioned before. A Vchunk cycle 601 includes c consecutive Vchunks 101. A Parcel cycle 603 includes N×m Parcels in total, which include m consecutive Parcels 109 in each physical storage drive 107 in N physical storage drives 107 included in a DPG 110. The number "c" is called a cycle Vchunk count. The number "m" is called a cycle Parcel count. A set of Vchunk cycles having common Vchunk cycle# in one or more VPGs including a common DPG 110 is called a Vchunk cycle group 602.

One Vchunk cycle group 602 corresponds to one Parcel cycle 603. In addition, parcel mapping 604 is cyclic. That is, the common parcel mapping 604 is used for each pair of a Vchunk cycle group 602 and a Parcel cycle 603. Because the parcel mapping 604 between virtual storage areas and physical storage areas is cyclic, data can be distributed appropriately to a plurality of physical storage areas, and also efficient administration of the parcel mapping 604 is realized. Note that non-cyclic parcel mapping, that is, parcel mapping with only one cycle, may be adopted.

Identifiers of Vchunks 101 in each Vchunk cycle 601 are represented by Cycle Vchunk# (CVC#). Accordingly, CVC# are values from 0 to c−1. Identifiers of Parcels 108 in a Parcel cycle 603 are represented by Local ParCel# (LPC#). LPC# are values from 0 to m−1. A plurality of physical parcels 109 are allocated to real data objects of a plurality of virtual parcels in one Vchunk 101.

In addition, identifiers of Vchunks 101 in a Vchunk cycle group 602 are represented by Local Vchunk# (LVC#). LVC# are determined uniquely from VPG#n and CVC#.

$$LVC\# = n \times C + CVC\#$$

Figure 7:
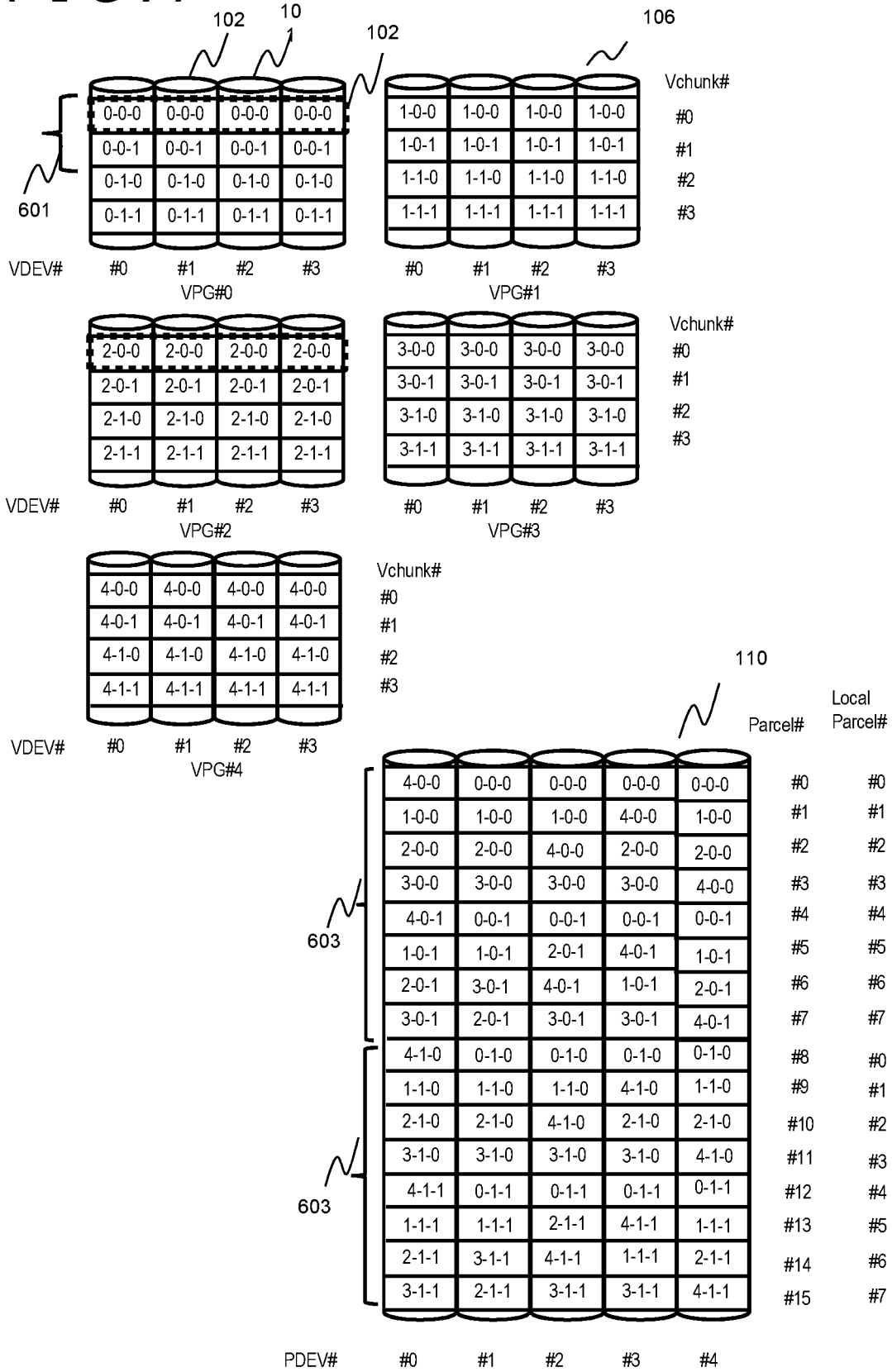
FIG. 7 is a block diagram depicting another example of parcel mapping between virtual storage areas and physical storage areas administered in the storage system in FIG. 2.

FIG. 7 depicts an example regarding the parcel mapping 604 of VPGs 106 and a DPG 110 in which c=2, m=8, K=4, and N=5. The number "c" is the Vchunk count of a Vchunk cycle 601, the number "m" is the Parcel count of a drive in a Parcel cycle 603, the number "K" is the drive count of a VPG 106, and the number "N" is the drive count of a DPG 110.

By repetitively arranging parcels for each combination of Vchunk cycles 601 and a Parcel cycle 603 in the parcel mapping in this manner, it is possible to reduce the scale of the mapping pattern and also to reduce the load of generation of the mapping pattern and the load of address translation.

In a Vchunk identifier "x-y-z" written for a virtual parcel 103 in a virtual storage drive 102 in a VPG 106, x represents VPG#, y represents Vchunk cycle#, and z represents CVC#. The same Vchunk identifier is written for a physical parcel allocated to the virtual parcel 103. In the parcel mapping, a correspondence relation between a plurality of virtual parcels 103 in one Vchunk cycle 601 and a plurality of physical parcels in one Parcel cycle 603 is called a mapping pattern. For example, the mapping pattern is represented by a Vchunk identifier corresponding to each physical parcel in one Parcel cycle 603. A common mapping pattern is used for each Parcel cycle 603.

In the present example, two Vchunk cycles 601 and two Parcel cycles 603 are depicted. Each Parcel cycle 603 is distributed to five physical storage drives 107. All physical parcels in one Parcel cycle 603 are allocated to virtual parcels in one Vchunk cycle group.

Whereas m=8 here, m only has to be an integer multiple of K in order to set mapping between VPGs and DPGs appropriately in a given case in which the number of physical storage drives 107 is not an integer multiple of K.

Figure 8:
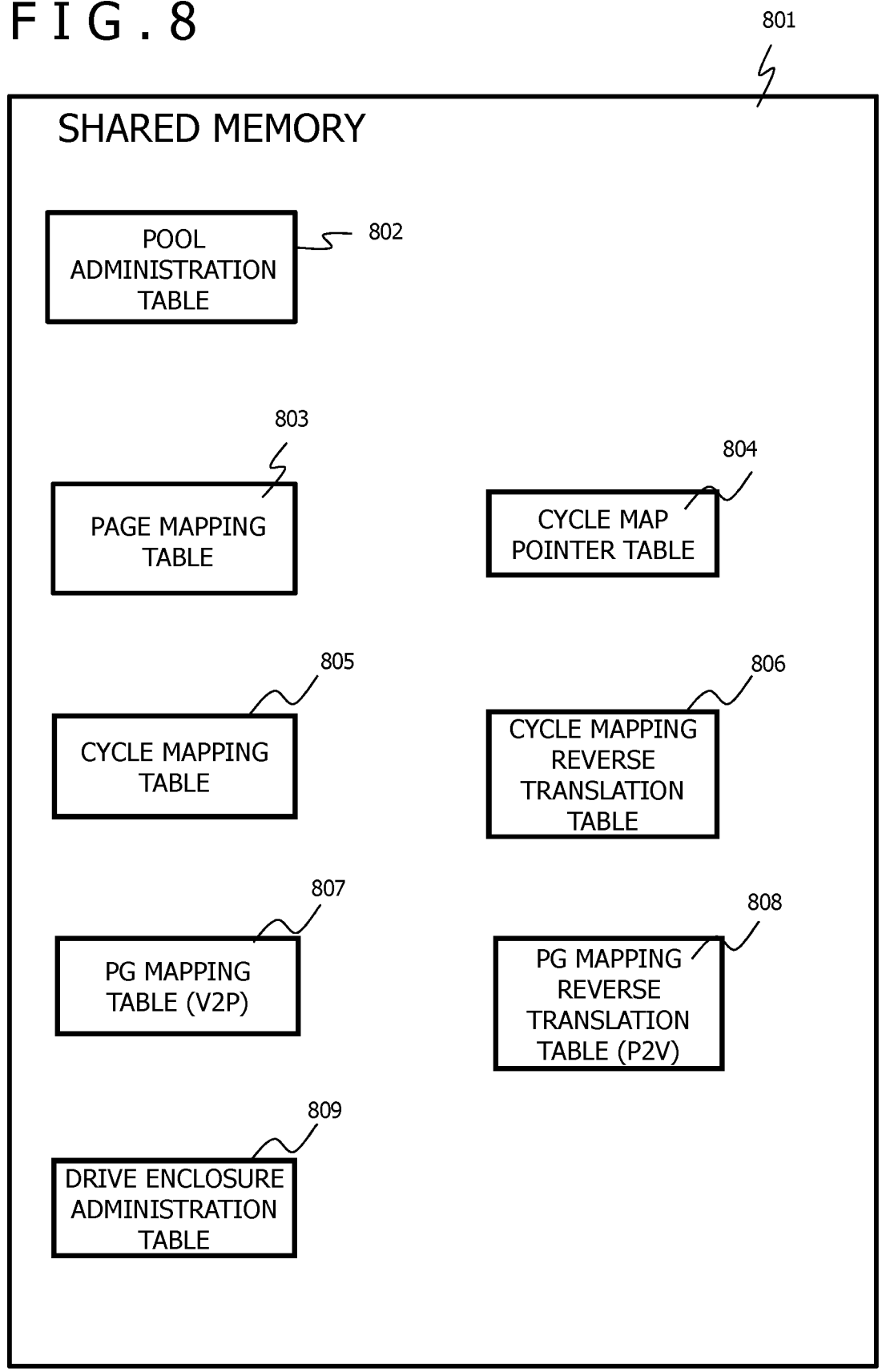
FIG. 8 is a block diagram depicting contents of a common memory administered in the storage system in FIG. 2.

FIG. 8 depicts contents of a shared memory.

For example, a shared memory 801 includes the storage area of at least any one of physical storage drives 107, CMs 214, and LMs 217. Note that a storage controller 202 may configure the logical shared memory 801 by using the storage areas of a plurality of configurations in the physical storage drives 107, the CMs 214, and the LMs 217 and perform cache administration regarding various types of information.

The shared memory 801 stores a pool administration table 802, a page mapping table 803, a cycle map pointer table 804, a cycle mapping table 805, a cycle mapping reverse translation table 806, a PG mapping table (V2P) 807, a PG mapping reverse translation table (P2V) 808, and a drive enclosure administration table 809.

In the parcel mapping, mapping patterns are represented by the PG mapping table 807, the cycle map pointer table 804, and the cycle mapping table 805.

In addition, at a time of addition of a drive, mapping patterns before the addition are called current mapping patterns (Current), mapping patterns during the addition are called temporary mapping patterns (Changing), and mapping patterns after the addition are called target mapping patterns (Target). That is, at a time of single drive addition, the shared memory 801 stores a Current cycle mapping table 805 and a cycle mapping reverse translation table 806, a Changing cycle mapping table 805 and a cycle mapping reverse translation table 806, and a Target cycle mapping table 805 and a cycle mapping reverse translation table 806. Note that the PG mapping table 807 and the cycle map pointer table 804 may store common tables before and after the addition, but this is not the sole configuration.

Figure 9:
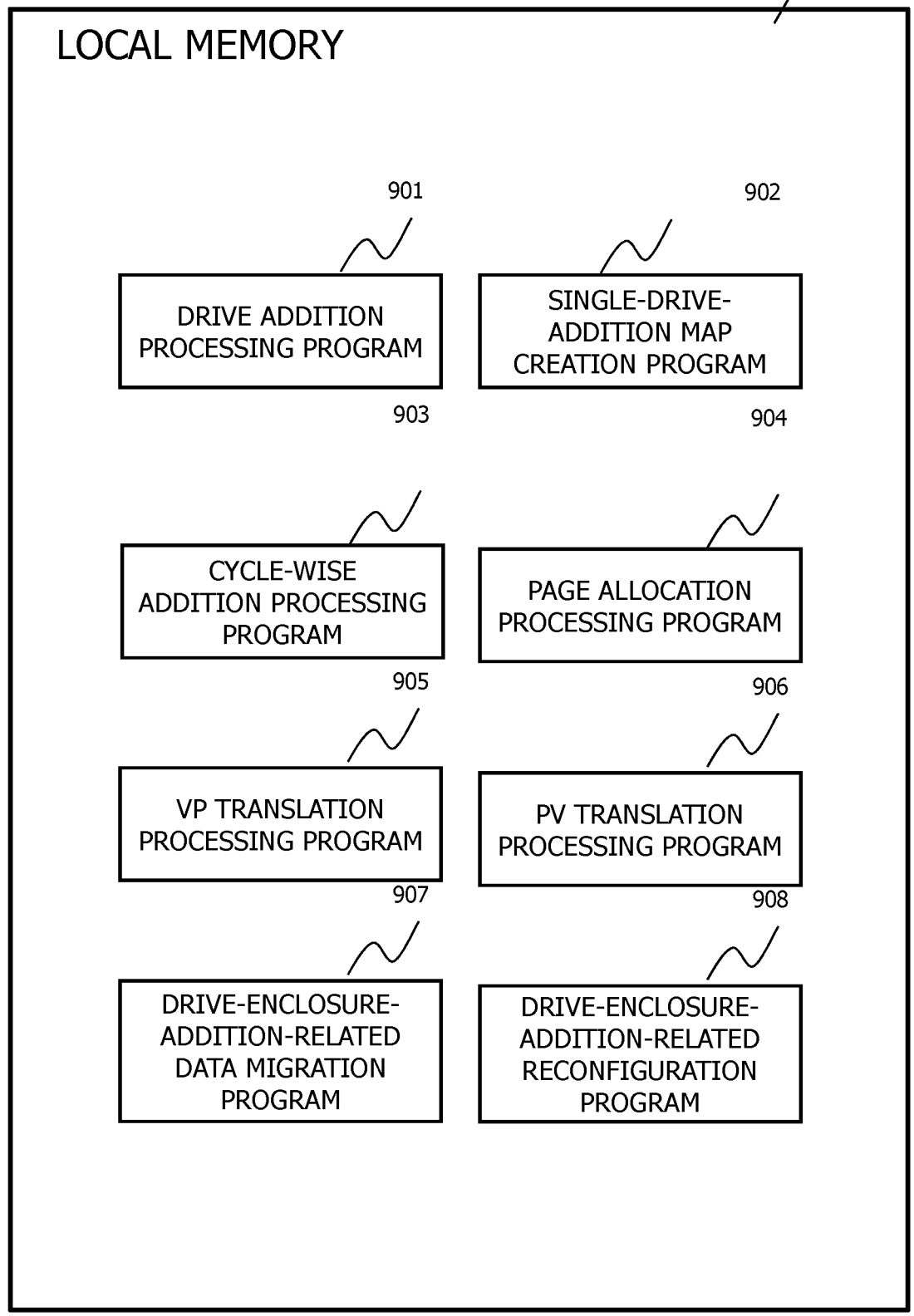
FIG. 9 is a block diagram depicting contents of a local memory in FIG. 2.

FIG. 9 depicts contents of a local memory.

A local memory 217 stores a drive addition processing program 901, a single-drive-addition map creation program 902, a cycle-wise addition processing program 903, a page allocation processing program 904, a VP translation processing program 905, a PV translation processing program 906, a drive-enclosure-addition-related data migration program 907, and a drive-enclosure-addition-related reconfiguration program 908. Specific uses of each process are mentioned later.

FIG. 10 depicts the pool administration table.

The pool administration table 802 is information representing a correspondence relation between pools 301 and VPGs 106. The pool administration table 802 includes fields of Pool# 1001, VPG# 1002, allocatable Vchunk counts 1003, and allocatable VPG page counts 1004.

On the table, a storage controller 202 can check identifiers of VPGs 106 belonging to a pool 301, the allocatable Vchunk count of each VPG 106, and the allocatable VPG page count 1004 of each VPG 106.

Fields of the allocatable Vchunk counts 1003 store values equal to or larger than zero on the basis of the capacities of corresponding DPGs 110. In VPGs 106 represented by VPG# 1002, pages cannot be allocated to Vchunk# over the allocatable Vchunk counts 1003. If a cycle Parcel count is m, and the number of Parcel cycles in a DPG is W, the maximum value V of the allocatable Vchunk counts 1003 is set according to the following criterion.

$$\text{Maximum value } V \text{ of allocatable Vchunk counts} = W \times m/K$$

Here, because m is an integer multiple of K, the result of the formula described above necessarily becomes an integer.

Note that, in a case in which Parcels are reserved separately as spare areas in a Parcel cycle or in other cases, m may not be a multiple of K. If the number of reserved parcels in a Parcel cycle is S, m−s only has to be a multiple of K, and the maximum value of allocatable Vchunk counts 1003 in that case is set according to the following criterion.

$$\text{Maximum value } V \text{ of allocatable Vchunk counts} = W \times (m-s)/K$$

Fields of the allocatable VPG page counts 1004 store values equal to or larger than zero on the basis of the capacities of corresponding DPGs 110. In VPGs 106 represented by VPG# 1002, pages cannot be allocated to VPG page# over the allocatable VPG page counts 1004. If an allocatable Vchunk count 1003 is V c, and an intra-Vchunk VPG page count is VP, an allocatable VPG page count P is set according to the following criterion.

$$\text{Allocatable VPG page count } P = V\_c \times VP$$

As is apparent from the formula described above, the allocatable VPG page count is proportional to the allocatable Vchunk count 1003. In a case in which it is stated simply that an allocatable Vchunk count 1003 is updated or deleted in an explanation below, the allocatable VPG page count 1004 is also updated together unless otherwise noted. The updated allocatable VPG page count 1004 is determined according to the criterion mentioned before.

FIG. 11 depicts the page mapping table.

The page mapping table 803 is information representing a correspondence relation between pages of VVOLs 302 and pages of VPGs 106. The page mapping table 803 includes fields of pool# 1101, VVOL# 1102, VVOL page# 1103, VPG# 1104 and VPG page# 1105. The pool# 1101, the VVOL# 1102, and the VVOL page# 1103 represent VVOL pages. The VPG# 1104 and the VPG page# 1105 represent VPG pages allocated to the VVOL pages. In fields of the VPG# 1104 and the VPG page# 1105 corresponding to unused VVOL page# 1103, a value corresponding to "Unallocated" is stored.

FIG. 12 depicts the map pointer table.

The cycle map pointer table 804 includes fields of DPG# 1201, Cycle# 1202, and cycle map versions 1203. On the table, a storage controller 202 can refer to the version of a cycle mapping table that should be referred to at a time of address translation. The cycle map versions 1203 are updated in a case in which a drive is added. "Target" in cycle map versions represent that addition processes of the cycles have been completed. In a case in which the storage controller 202 accesses a DPG-space address during an addition process, the storage controller 202 performs address translation by using a cycle mapping table after the addition if the cycle map version corresponding to a cycle of the specified DPG space is "Target," performs address translation by using a cycle mapping table before the addition if the cycle map version is "Current," and performs address translation by using a cycle mapping table during the addition if the cycle map version is "Changing."

Figure 13:
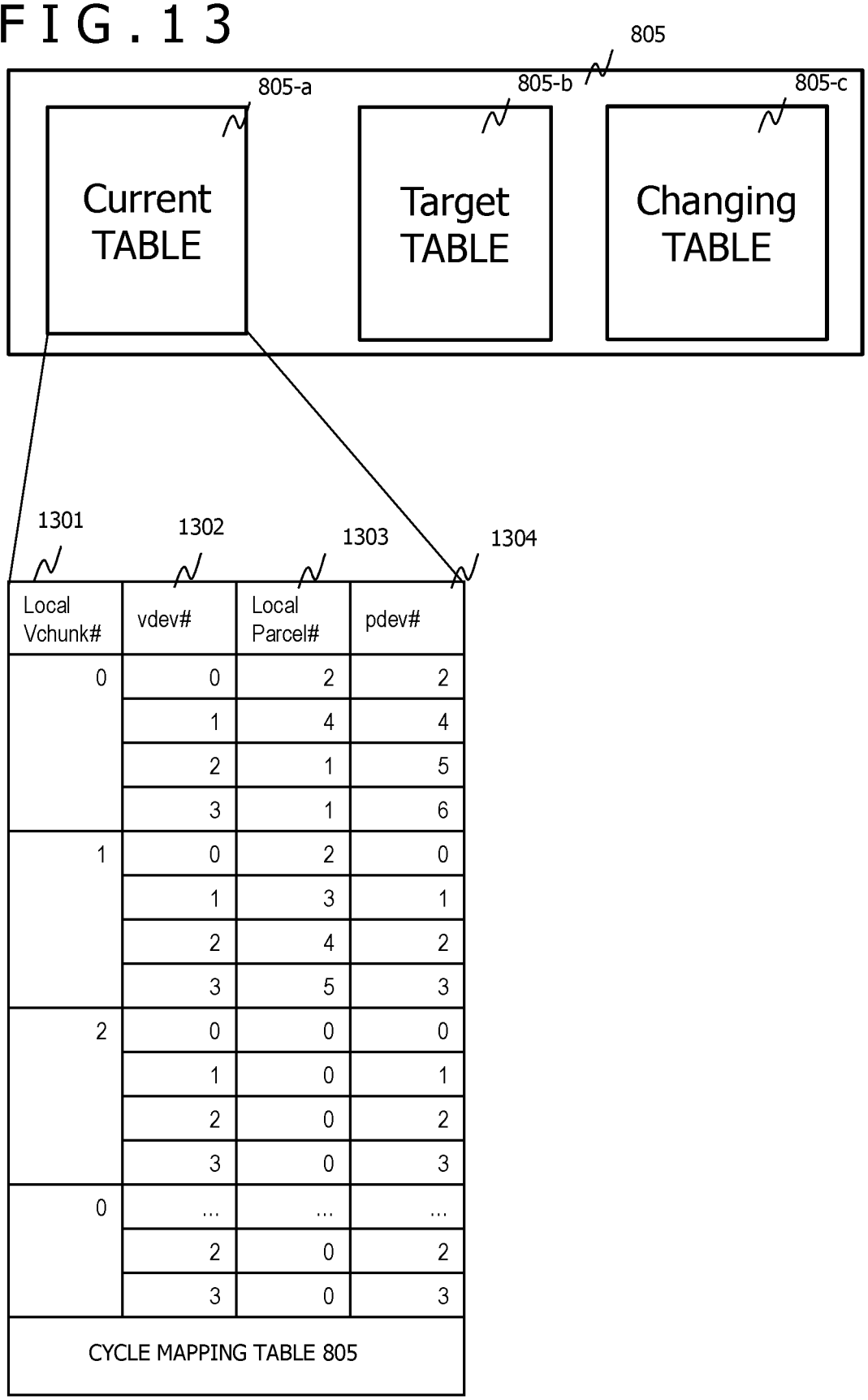
FIG. 13 is a figure depicting an example of a cycle mapping table in FIG. 8.

FIG. 13 depicts the cycle mapping table.

The cycle mapping table 805 has three types of table, Current, Target, and Changing tables. These exist in order to refer to correct addresses in the ongoing state of a drive addition process explained below. Current represents a current mapping table, Target represents a target mapping table after addition/removal, and Changing represents a mapping table during the transient state of addition/removal. Each cycle mapping table 805 includes fields of Cycle Vchunk# 1301, VDEV# 1302, Local Parcel# 1303, and pdev# 1304.

By referring to the mapping table, a storage controller 202 can acquire Local Parcel# and PDEV# by using CycleVchunk# and VDEV# as keys.

Figure 14:
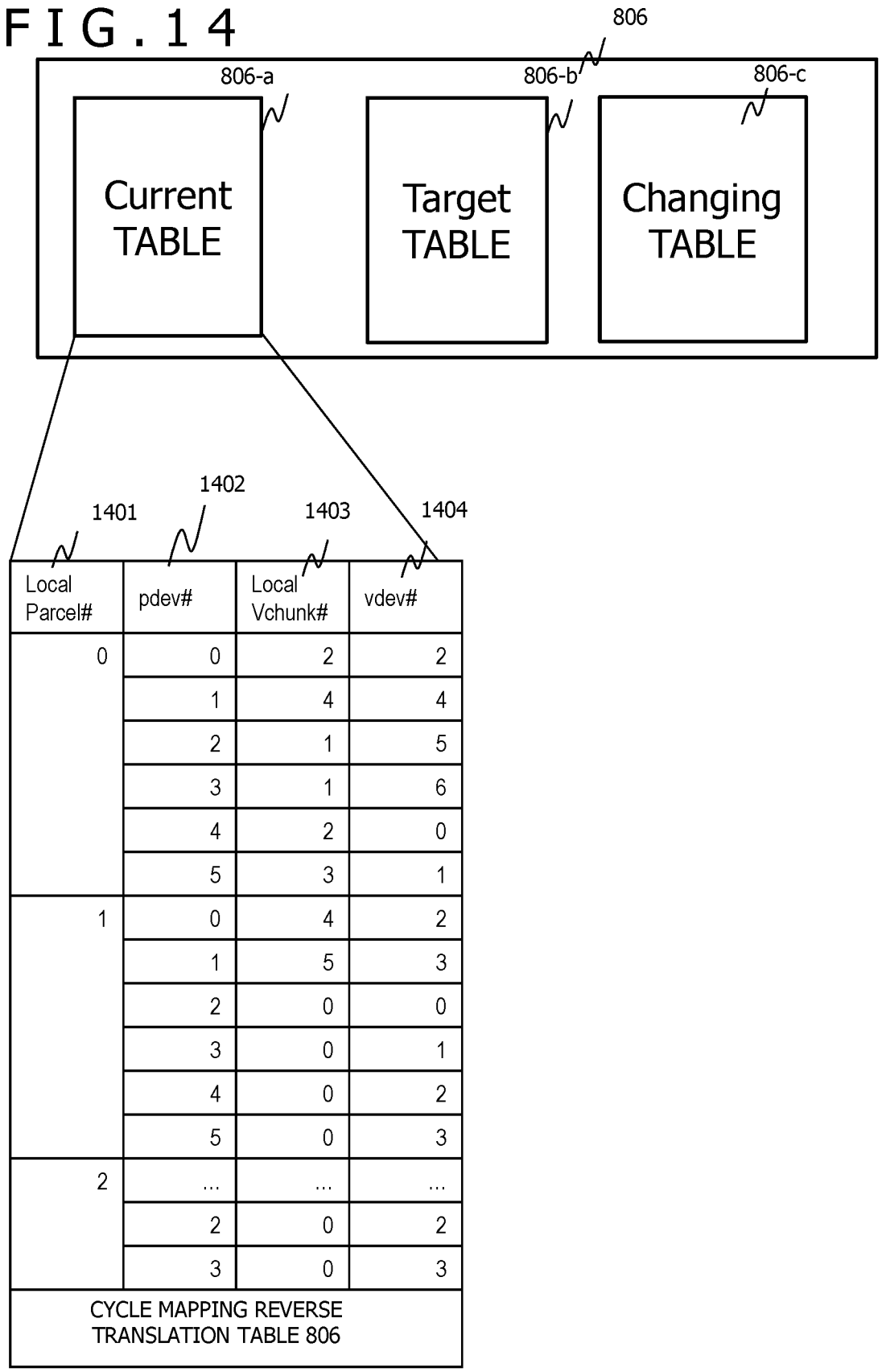
FIG. 14 is a figure depicting an example of a cycle mapping reverse translation table in FIG. 8.

A cycle mapping reverse translation table 806 depicted in FIG. 14 is a reverse lookup table of a cycle mapping table 805, and, similarly to the cycle mapping table 805, has two types of table, Current and Target tables.

The cycle mapping reverse translation table 806 has three types of table, Current, Target, and Changing tables. The Current cycle mapping reverse translation table 806 is a reverse lookup table of the Current cycle mapping table 805, the Target cycle mapping reverse translation table 806 is a reverse lookup table of the Target cycle mapping table 805, and the Changing cycle mapping reverse translation table 806 is a reverse lookup table of the Changing cycle mapping table 805.

Each cycle mapping reverse translation table 806 includes fields of Local Parcel# 1401, pdev# 1402, Local Vchunk# 1403 and VDEV# 1404. By referring to this mapping reverse-translation table, a storage controller 202 can acquire Cycle Vchunk# and VDEV# by using Local Parcel# and PDEV# as keys.

This mapping reverse-translation table is updated in conjunction with the cycle mapping table 805. In a case in which a cycle mapping table 805 is created, updated, or deleted, or setting of a Current table, a Target table and a Changing table is performed in an explanation below, a cycle mapping reverse translation table 806 is also created, updated, or deleted, or setting of a Current table, a Target table, or a Changing table is performed according to the cycle mapping table 805, unless otherwise noted.

Methods of generating and referring to data in cycle mapping tables and cycle mapping reverse translation tables are mentioned later.

FIG. 15A depicts the PG mapping (V2P) table 807. The PG mapping (V2P) table 807 is a table for administering mapping between VPGs and DPGs. The PG mapping (V2P) table 807 includes virtual parity group numbers (VPG#) 1501 and distributed Parity group numbers (DPG#) 1502.

On the PG mapping (V2P) table 807, values of the distributed Parity group numbers (DPG#) 1502 can be determined from the virtual parity group numbers (VPG#) 1501.

The PG mapping (P2V) table 808 depicted in FIG. 15B is a reverse lookup table of the PG mapping (V2P) table 807. The PG mapping (P2V) table 808 includes distributed Parity group numbers (DPG#) 1504 and virtual parity group numbers (VPG#) 1503.

On the PG mapping (P2V) table 808, values of the virtual parity group numbers (VPG#) 1503 can be determined from the distributed Parity group numbers (DPG#) 1504.

FIG. 16 depicts the drive enclosure administration table 809. The drive enclosure administration table 809 includes drive enclosure numbers (DE#) 1601 and physical storage drive numbers (PDEV#) 1602.

Figure 17A:
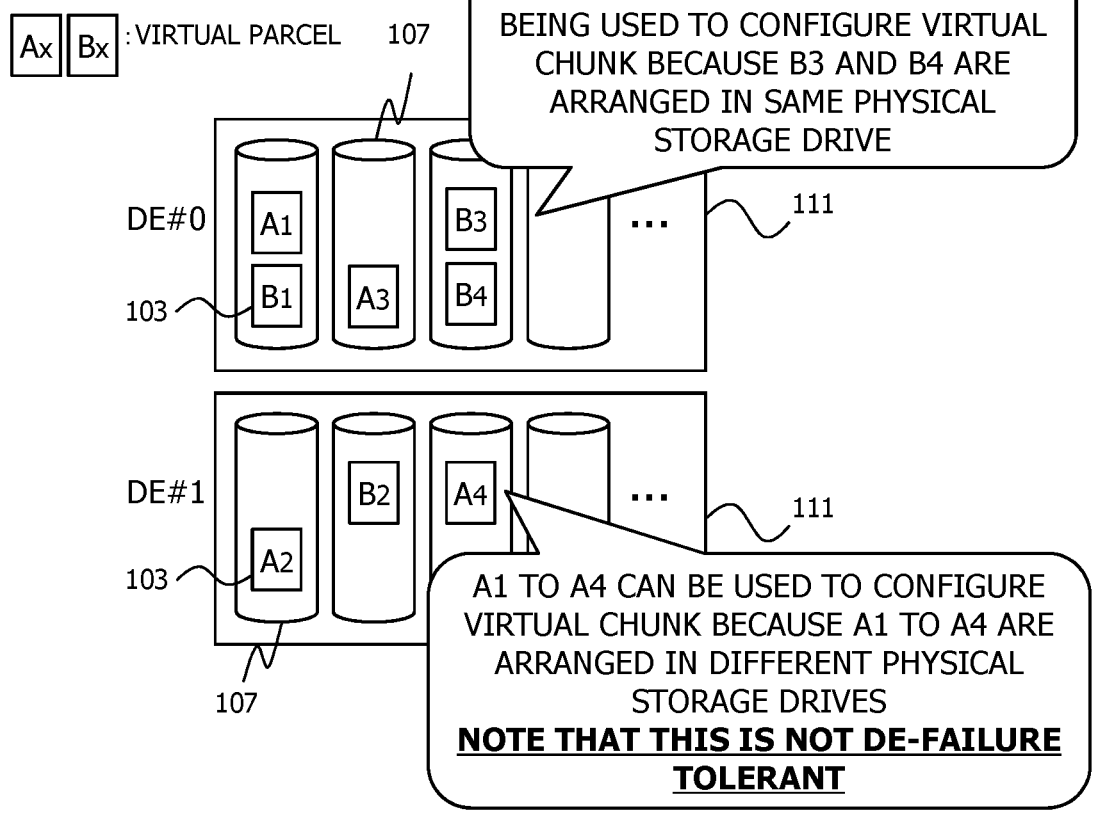
FIG. 17 depicts conceptual diagrams depicting features of parcel mapping in the storage system according to the first embodiment.
Figure 17B:
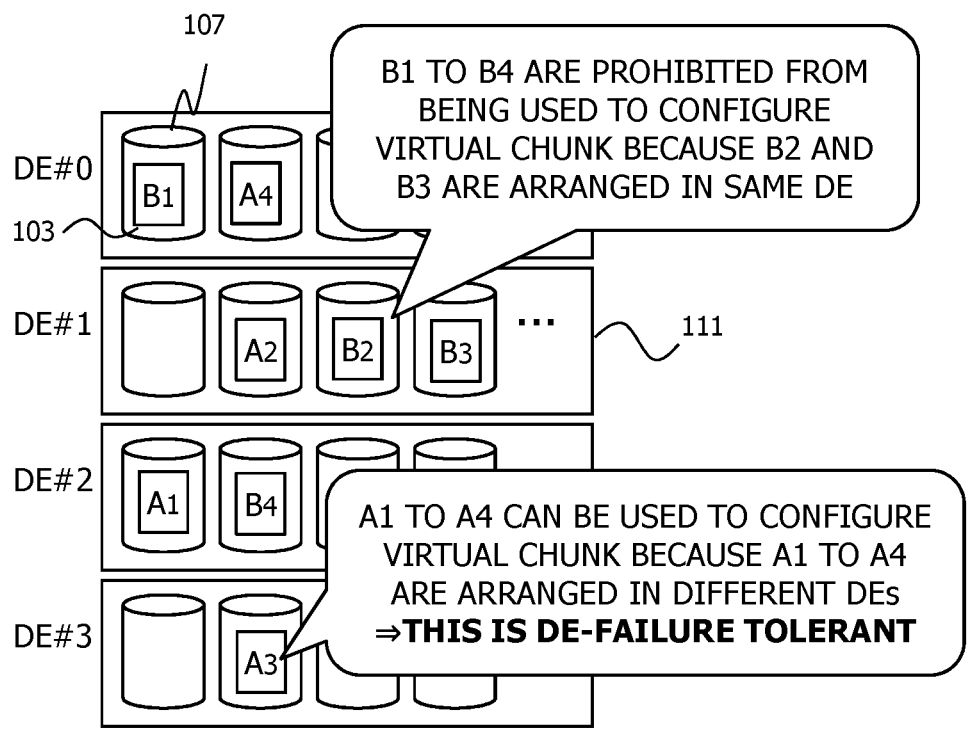

FIG. 17 depicts a figure for explaining features of the parcel mapping in the computer system (storage system) according to the present embodiment, in other words, mapping conditions of the parcel mapping. An explanation is given below with reference to reference signs in FIG. 1.

(1) Basic Mapping Scheme

Virtual parcels 103 which are small areas with a prescribe size are selected in an amount equal to a RAID width (example: four in the case of 2D2P), and a virtual chunk 101 is constructed. Whereas there is a condition to be applied at a time of creation of a virtual chunk 101 that "virtual parcels 103 included in a virtual chunk 101 are all selected from different physical storage drives 107" as explained already, for the purpose of giving drive enclosure failure tolerance in the present embodiment, a condition that "regarding the virtual parcels 103 included in the virtual chunk 101, the maximum value of the numbers of virtual parcels 103 belonging to each drive enclosure 111 is equal to or smaller than a prescribed value" is added to the condition mentioned above.

(2) Arrangement Condition Settings According to Redundancy of Virtual Chunk 101 and Redundancy of Drive Enclosure 111

In a case in which the redundancy of a virtual chunk 101 is p (example: p=2 in the case of 4D2P), and necessary drive enclosure failure tolerance is r, the number of virtual parcels 103 that are included in the given virtual chunk 101 and allowed to be arranged in the same drive enclosure 111 is Floor(p/r). For example, in a case in which the configuration of a virtual chunk 101 is 10D4P, and it is desired to attain the tolerance against failures of up to two drive enclosures 111, the number of virtual parcels 103 that are in the same virtual chunk 101 and are allowed to be arranged in the same drive enclosure 111 is 4/2=2. The drive enclosure failure tolerance here is a numerical value representing the maximum number of malfunctioning drive enclosures 111 that is tolerated.

(3) Maintenance Operation Scheme

At a time of initial construction, the RAID configuration (dDpP), scheduled drive enclosure count and drive enclosure failure tolerance number r (r p) of a virtual chunk 101 are decided. Note that the scheduled drive enclosure count is mentioned later.

In a case in which the current number of drive enclosures 111 is smaller than the scheduled drive enclosure count, necessary drive enclosure failure tolerance cannot be attained, in some cases. It should be noted that, after the scheduled drive enclosure count is reached due to drive enclosure addition, it becomes possible to attain the target drive enclosure failure tolerance by rearrangement of physical storage drives 107 or addition of physical storage drives 107+data migration.

Physical storage drives are added in units of (d+p)r/p drives. For example, in the case of 10D4P and the failure tolerance of drive enclosures 111 which is equal to two, drives are added in units of seven drives.

At a time of a rebuild, recovery data storage destinations are selected such that the drive enclosure failure tolerance can be maintained as much as possible. That is, the recovery data is stored on a drive enclosure 111 whose number of virtual parcels 103 is smaller than a prescribed value.

(4) Other Aspects

In a case in which the scheduled drive enclosure count is to be changed, it is also possible to change from arrangement that satisfies only a condition that virtual parcels 103 included in a virtual chunk 101 are all selected from different physical storage drives 107 to arrangement that satisfies the conditions of the present embodiment (n.b. movement of entire data is necessary).

It is also possible to add physical storage drives 107 in units of fewer than (d+p)r/p drives. It should be noted that, in a case in which the total number of physical storage drives 107 is not an integer multiple of (d+p)r/p, the preset drive enclosure failure tolerance cannot be attained.

Here, the scheduled drive enclosure count is explained with reference to FIG. 33.

There are no problems in a case in which the number of drive enclosures 111 has been a prescribed number since the start of operation (e.g. four drive enclosures 111 are installed in a 3D1P configuration). It should be noted that, if a condition dictates that there must be four drive enclosures 111 from the beginning, the initial cost increases, and so a small start is allowed, that is, it is allowed to install drive enclosures only in an amount equal to or smaller than a prescribed number at a time of the start of operation.

In view of this, the "scheduled drive enclosure count" is defined. The scheduled drive enclosure count is defined as the number of drive enclosures that are to be used for operation of a DPG in the end, and data mapping in each physical storage drive 107 is decided on the basis of the scheduled drive enclosure count.

An operation scenario in a case in which the scheduled drive enclosure count is four in a 3D1P configuration is explained below.

(1) The current drive enclosure count is smaller than the scheduled drive enclosure count (drive enclosure count=2).

Figure 33A:
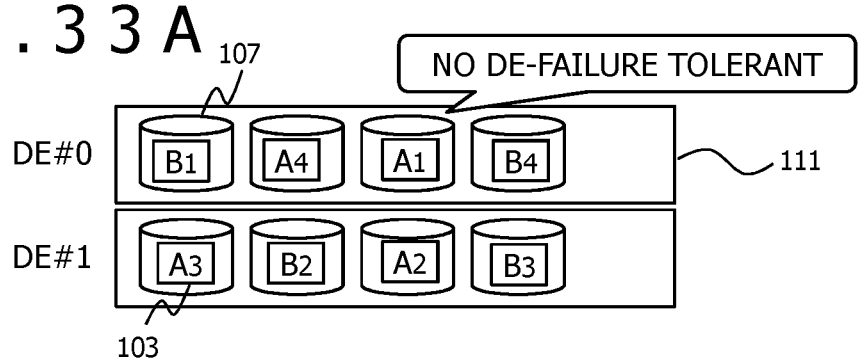
FIG. 33 depicts conceptual diagrams for explaining a technique of drive enclosure addition in the storage system according to the first embodiment.

As depicted in FIG. 33A, the preset drive enclosure failure tolerance cannot be attained at this time point.

(2) The current drive enclosure count is increased to the scheduled drive enclosure count by addition of drives (drive enclosure count=2→4).

Figure 33B:
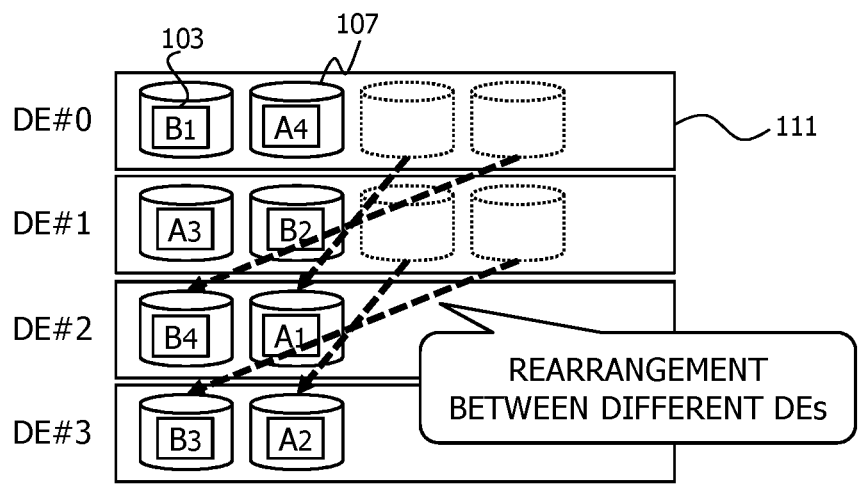
Figure 33C:
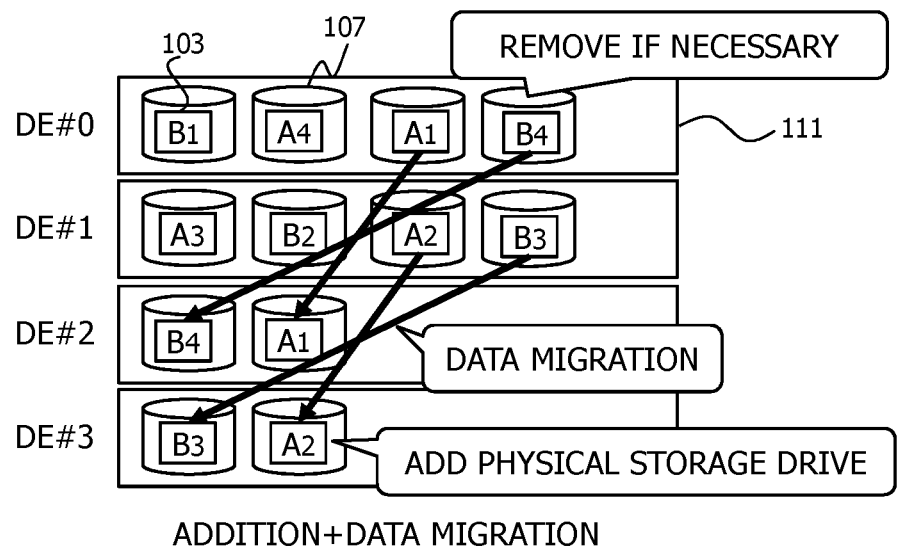

In this case, the prescribed drive enclosure failure tolerance can be acquired by (i) rearrangement of physical storage drives 107 as depicted in FIG. 33B or (ii) addition of physical storage drives 107 as depicted in FIG. 33C+data migration.

In (i) rearrangement of physical storage drives 107, the system is stopped, and the positions of physical storage drives 107 are physically rearranged at positions according to an instruction from the system. Because mapping has been decided originally such that the preset drive enclosure failure tolerance can be attained in the case of the arrangement in FIG. 33B, data migration is unnecessary, and the system stoppage time is short. After the completion of rearrangement of the physical storage drives 107, the drive-enclosure-addition-related reconfiguration program 908 is executed, and the drive enclosure administration table 809 is updated to the configuration after the change.

In the case of (ii) addition+data migration, first, a prescribed number of physical storage drives 107 is added, and data migration by the drive-enclosure-addition-related data migration program 907 is implemented. In a case in which there are physical storage drives 107 that have become unnecessary, it is also possible to remove the physical storage drives 107. This can be executed without a stoppage, but there is a possibility the migration time requires a long time.

Figure 18:
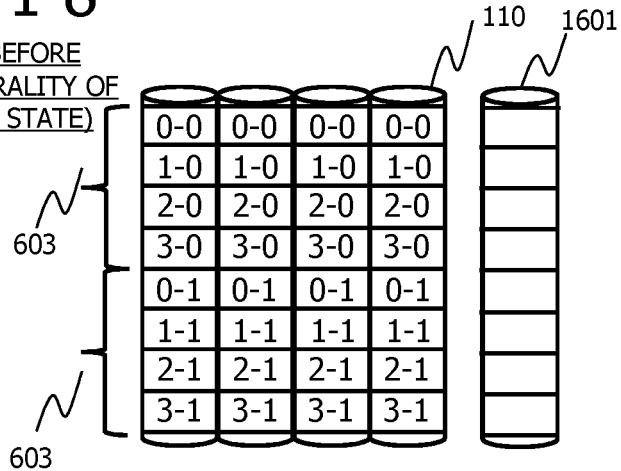
FIG. 18 is a block diagram depicting an example of a parcel mapping method implemented at a time of addition of one physical storage drive used in the storage system in FIG. 2.
Figure 18:
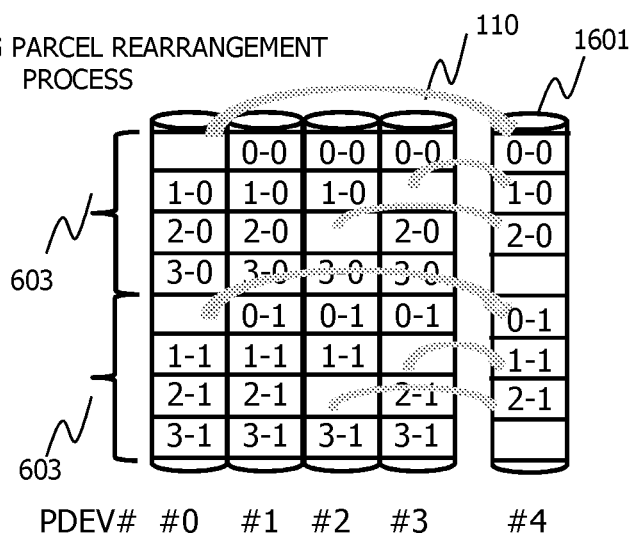
Figure 18:
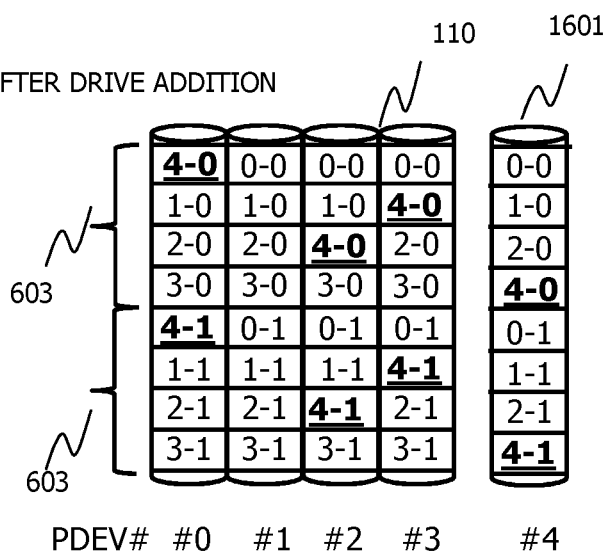

FIG. 18 depicts a mapping pattern creation method in a drive-wise addition process.

In the example depicted here, in the configuration with cycle Parcel count m=4, and drive count N=4, the drive count which has been four is increased by adding one drive, and the drive count is changed to five.

P1 depicts a current mapping pattern which is the initial mapping pattern before the drive addition. Note that, in the example in this figure, only two Parcel cycles 603 are depicted for simplification.

In a Vchunk identifier "x-y" written for a physical parcel 109 in a physical storage drive 107 in a DPG 110, x represents LVC# of the corresponding virtual parcel 103, and y represents Vchunk cycle#.

Because data redundancy is not possible only with an added drive area in this state, the storage controller 202 cannot store data yet.

P2 depicts a mapping pattern during the drive addition. Some of Parcels 108 included in existing Vchunks 101 are allocated to an added drive 1601. Thereby, in the existing physical storage drives 107, there are now Parcels which are not mapped to the Vchunks 101. Whereas, in the example in this figure, Parcels 108 to be moved are selected each from one of three physical storage drives 107 in the existing four physical storage drives 107, and three Parcels in total are moved per Parcel cycle, the movement amount depends on the cycle Parcel count, the number of reserved parcels in a cycle Parcel, and the number of Parcels included in a Vchunk. If the cycle Parcel count is m, the number of reserved parcels in a cycle Parcel is S, and the VPG drive count is K, the movement amount T per Parcel cycle is expressed by the following formula.

$$T=(K-1)\times(m-s)/K$$

In P3, new Vchunks are created. The new Vchunks include Parcels that are generated due to the existing Vchunk reconfiguration process mentioned before and are not mapped to Vchunks.

The number of new Vchunks per Parcel cycle depends on the cycle Parcel count, the number of reserved parcels in a cycle Parcel, and the number of Parcels included in a Vchunk. If the cycle Parcel count is m, the number of reserved parcels in a cycle Parcel is S, and the VPG drive count is K, the number V of new Vchunks is expressed by the following formula.

$$V=(m-s)/K$$

Note that the capacity (=V×K) of the new Vchunks is equal to the capacity (=m−s) of the added drive 1601 excluding spares.

Thereafter, the storage controller 202 performs a parcel moving process of moving data according to the mapping pattern and completes the addition process. After the completion of the parcel moving process, the storage controller 202 permits all VPG pages in the new Vchunks to be allocated to VVOL pages.

In the data movement depicted in the present embodiment, in order to use the capacity m−s excluding the capacity to be reserved as spares in the capacity per Parcel cycle of the added drive as depicted in P2 and P3, data movement in an amount of:

$$T(=(K-1)\times(m-s)/K)$$

is necessary. In other words, the capacity of the added drive becomes available due to the data movement in an amount of (K−1)/K which corresponds to the capacity of the added drive.

Whereas FIG. 18 depicts only an example of the mapping pattern creation method at a time of single-drive addition, the mapping pattern after addition of X drives can be created by repeating single-drive addition X times when a plurality of drives are added collectively, for example, in a case in which X drives are added simultaneously.

Details of operation of the storage controller 202 are explained below.

Figure 19:
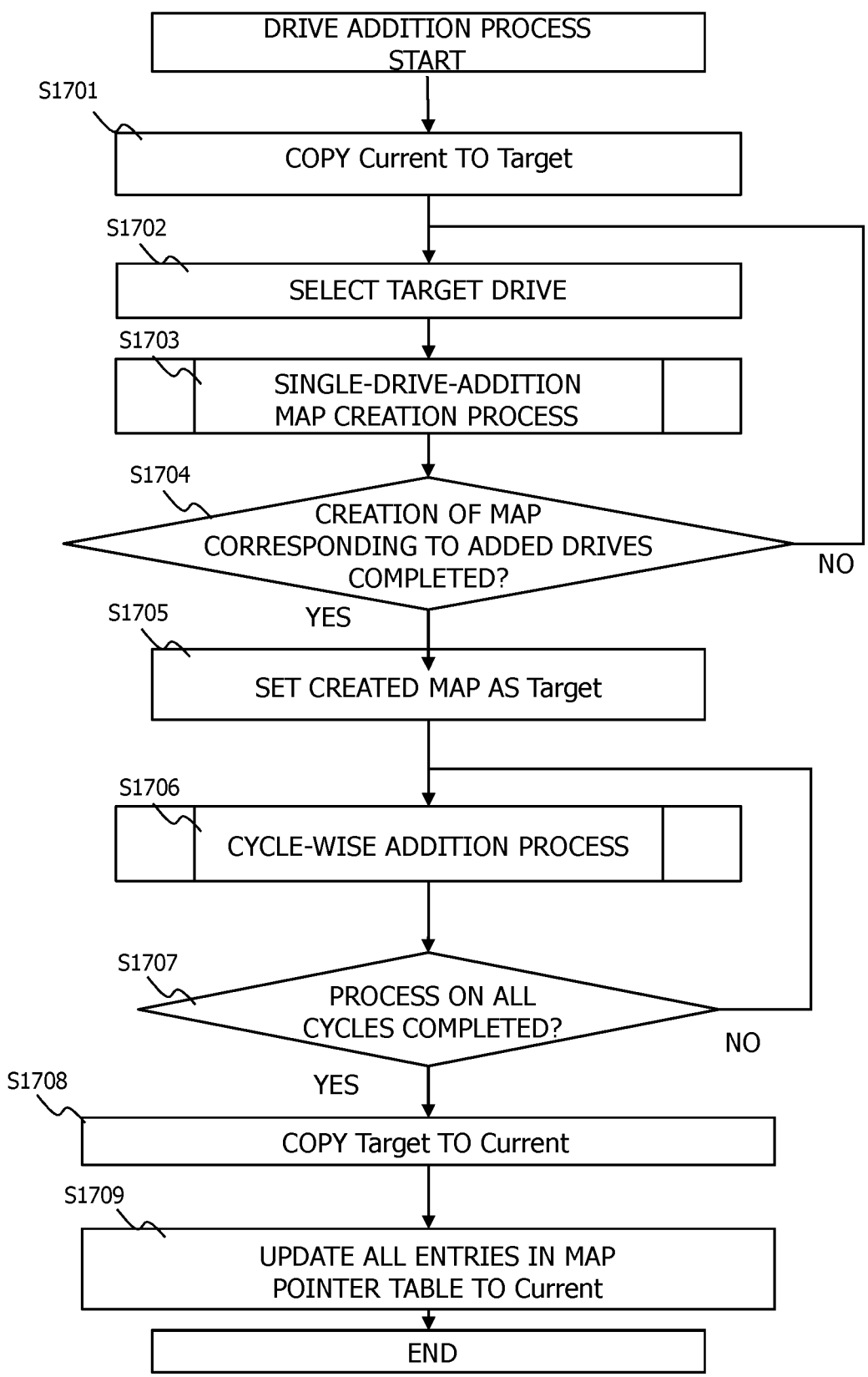
FIG. 19 is a flowchart depicting an example of a drive addition process implemented in the storage system in FIG. 2.

FIG. 19 depicts a single-drive-addition process.

The drive addition processing program 901 performs an addition process in a case in which a drive is added. After adding a drive for addition to the system, an administrator inputs, to the administration server 203, a drive-wise addition instruction to a DPG. By being triggered by reception of the addition instruction from the administration server 203, the storage controller 202 executes the single-drive-addition process. Alternatively, by being triggered by detection of addition of the drive for addition to the system, the administration server 203 or the storage controller 202 may execute the single-drive-addition process automatically.

First, the drive addition processing program 901 copies, to the Target cycle mapping table, the contents of the Current table of the cycle mapping table 805 (Step S1701).

Next, the drive addition processing program 901 selects one given drive as a target drive from added drives (Step S1702). For example, from drives for which the drive addition process has not been implemented in the added drives, the drive addition processing program 901 may choose the target drive in ascending order of physical drive# in the system.

Next, the drive addition processing program 901 implements a post-single-drive-addition map creation process (Step S1703). The post-single-drive-addition map creation process is mentioned later.

Next, the drive addition processing program 901 determines whether the post-single-drive-addition map creation process has been completed on all the added drives added to the system (Step S1704). In a case in which the post-single-drive-addition map creation process has not been completed on all the added drives (No at Step S1704), the drive addition processing program 901 returns to Step S1702, and implements a similar process on the next target drive, and in a case in which the post-single-drive-addition map creation process has been completed on all the added drives (Yes at Step S1704), the drive addition processing program 901 sets the created mapping pattern after the addition as the Target table of the cycle mapping table 805 (Step S1705).

Next, the drive addition processing program 901 implements a cycle-wise addition process (Step S1706). The cycle-wise addition process is mentioned later.

Next, the drive addition processing program 901 determines whether the cycle-wise addition process has been completed on all cycles (Step S1707).

The determination may be performed with reference to the cycle map pointer table 804, for example. If all cycle map versions 1203 corresponding to addition-target DPG# represent that Target should be referred to, it can be considered that the cycle-wise addition process has been completed.

In a case in which the cycle-wise addition process has not been completed on all the cycles (No at Step S1707), the drive addition processing program 901 returns to Step S1706 and implements a similar process on the next target drive, and in a case in which the cycle-wise addition process has been completed on all the cycles (Yes at Step S1707), the drive addition processing program 901 updates the Current cycle mapping table 805 to the Target cycle mapping table (Step S1705). Thereby, the Current table and the Target table have matching contents of the mapping pattern after the addition.

Next, the drive addition processing program 901 refers to the cycle map pointer table 804, updates all cycle map versions 1203 corresponding to addition-target DPG# to Current, and completes the process (Step S1709). Thereby, even in a case in which the process mentioned-above is implemented again and the Target table is updated at a time of next new drive addition, the current mapping pattern can be referred to continuously.

Figure 20:
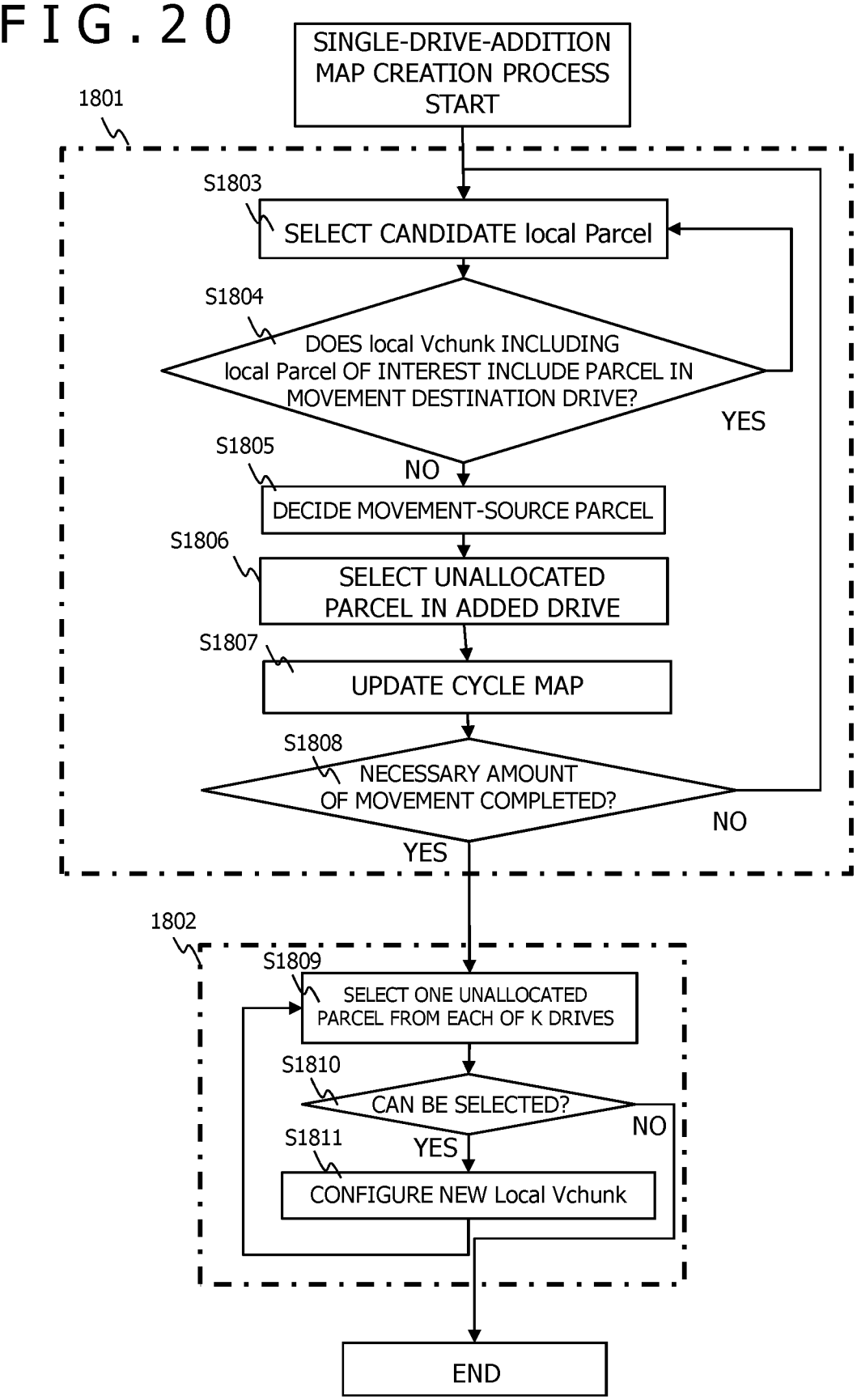
FIG. 20 is a flowchart depicting a single-drive-addition map creation process in FIG. 17.

FIG. 20 depicts the single-drive-addition map creation process. The single-drive-addition map creation process generally includes an existing parcel rearrangement process 1801 of updating information regarding parcels included in existing Vchunks and a new Vchunk allocation process 1802 of newly allocating Vchunks to an added capacity. The respective processes are explained separately.

In the existing parcel rearrangement process 1801, the single-drive-addition map creation program 902 changes several of existing Vchunks including physical parcels 109 in existing physical storage drives 107 to a configuration using physical parcels of an added drive 1601, and updates the cycle mapping table 805.

First, the single-drive-addition map creation program 902 selects one of physical parcels 109 allocated to an existing Local Vchunk as a movement-source candidate, and acquires Local Parcel# and PDEV# of the parcel (Step S1803). The single-drive-addition map creation program 902 may directly select Local Parcel# and PDEV# or may decide target Local Vchunk# and VDEV#, and then acquire corresponding Local Parcel# and PDEV# by referring to the cycle mapping table 805. Here, for example, the single-drive-addition map creation program 902 makes a selection in the single-drive-addition map creation process such that the number of parcels selected as movement sources makes the numbers of parcels even among the existing PDEVs. The selected physical parcels 109 are called candidate parcels below.

Next, the single-drive-addition map creation program 902 determines whether or not Local Vchunks including the candidate parcels include Parcels in the added drive (Step S1804). The single-drive-addition map creation program 902 refers to the Target cycle mapping reverse translation table 806, and acquires Local Vchunk# by using, as keys, Local Parcel# and PDEV# of the candidate parcel acquired at Step S1803. Next, the single-drive-addition map creation program 902 refers to the Target cycle mapping table 805, and acquires all VDEV# included in Local Vchunk# by using Local Vchunk# as keys, and PDEV# of Parcels corresponding to the Local Vchunk# and the VDEV#. In a case in which at least one of acquired PDEV# matches PDEV# of the added drive, the process branches to Yes at Step S1804, and executes Step S1803 again.

In a case in which all acquired PDEV# do not match PDEV# of the added drive (No at Step S1804), the single-drive-addition map creation program 902 fixes the candidate parcel as a movement-source parcel (Step S1805).

Next, the single-drive-addition map creation program 902 selects a parcel unallocated to the cycle mapping table 805 from physical Parcels in the added drive, and fixes the parcel as a movement-destination parcel (Step S1806). Means for determining whether or not a parcel is unallocated is not limited particularly. For example, a table that administers the allocated/unallocated state of each parcel# may be used for the determination. Alternatively, queues of parcel# in the unallocated state may be administered, and unallocated parcels may be acquired by referring to the queues.

Next, the single-drive-addition map creation program 902 updates the configuration information of Vchunk including the movement-source parcel such that the configuration information includes the movement-destination parcel (Step S1807). The single-drive-addition map creation program 902 refers to the Target cycle mapping reverse translation table 806, and acquires Local Vchunk# and VDEV# by using, as keys, Local Parcel# and the PDEV# of the movement source. Next, entries 1303 of Local Parcel# and entries 1304 of PDEV# that can be acquired by using, as keys, acquired Local Vchunk# and VDEV# are updated to Local PDEV# and PDEV# of the movement-destination parcel. Furthermore, the single-drive-addition map creation program 902 updates the Target cycle mapping reverse translation table 806 according to the cycle mapping table 805. At this time point, the movement-source parcel is no longer included in the Local Vchunk, and so invalid values are stored in fields of Local Vchunk# 1403 and VDEV# that can be acquired by using Local Parcel# and PDEV# of the movement-source parcel as keys.

Next, the single-drive-addition map creation program 902 determines whether a sufficient amount of existing parcels has been moved (Step S1808). In a case in which the number of parcels moved to the added drive is smaller than T which is the movement amount mentioned before (No at Step S1808), the single-drive-addition map creation program 902 returns to Step S1803, and performs the process.

In a case in which the number of parcels moved to the added drive is equal to or larger than T which is the movement amount mentioned before (Yes at Step S1808), the single-drive-addition map creation program 902 proceeds to the new Vchunk allocation process 1802.

In the new Vchunk allocation process 1802, first, the single-drive-addition map creation program 902 attempts to select one unallocated physical parcel from each of K drives (Step S1809).

If it is possible to make a selection (Yes at Step S1810), the single-drive-addition map creation program 902 configures a new Vchunk by using the selected K Parcels (Step S1811). The single-drive-addition map creation program 902 adds a new Local Vchunk# entry to the Target cycle mapping table 805, and sets Local Parcel# and PDEV# of the selected K parcels for K VDEV# included in the new Local Vchunk#. The Target cycle mapping reverse translation table 806 is also updated according to the cycle mapping table 805. Note that the method of selecting the K drives is not limited particularly, but, for example, it is sufficient if the K drives may be selected by prioritizing drives having larger numbers of unallocated parcels.

At the time point when the new Vchunk has been configured, VPG# to which the Vchunk is allocated is decided uniquely. Allocation target VPG# and Cycle Vchunk# in the VPG are determined according to the following computation formulae.

$$VPG\#=Floor(LVC\#/C)$$

$$Cycle\ Vchunk\#=LVC\#\ mod\ C$$

In a case in which K parcels could not be selected at Step S1810 (No), the single-drive-addition map creation program 902 ends the process.

By the process explained thus far, the mapping pattern configuring the Vchunk by using the capacity of the added drive is created. Note that, whereas the single-drive-addition map creation program 902 in the storage controller 202 is described as the subject of the single-drive-addition map creation process in the present embodiment, this process may partially or entirely be performed by another subject. For example, in another possible example, a mapping pattern according to the configuration is created in advance by using a high-performance computer, and the storage controller 202 reads and uses the created mapping pattern. Thereby, the load of the storage controller 202 can be reduced, and additionally, a mapping pattern with better characteristics can be used.

Figure 21:
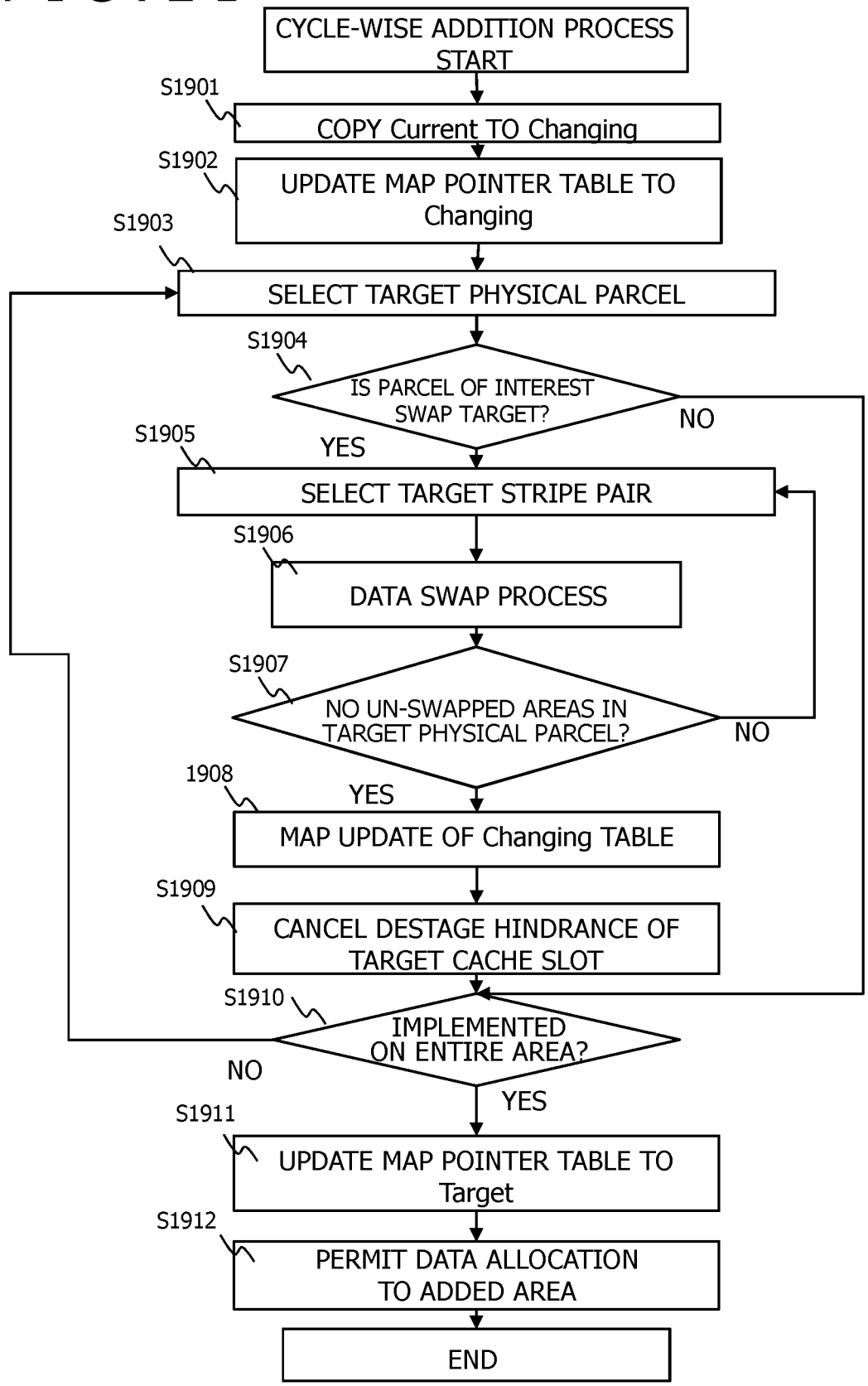
FIG. 21 is a flowchart depicting a cycle-wise addition process in FIG. 17.

FIG. 21 depicts the cycle-wise addition process.

The cycle-wise addition processing program 903 performs the process at Step S1706 in the drive addition process mentioned before. The cycle-wise addition process executes a data SWAP process mentioned later to thereby change arrangement of data represented by the current mapping pattern (Current) to arrangement of data represented by the target mapping pattern (Target).

First, the cycle-wise addition processing program 903 copies the Current table of the cycle mapping table 805 to the Changing table (Step S1901), and updates the cycle map version entry of the cycle in the cycle map pointer table 804 to Changing (Step S1902).

Next, the cycle-wise addition processing program 903 sequentially selects, as a target physical parcel, one physical parcel in the addition-target cycle mapping table 805 (Step S1903). For example, it is sufficient if the cycle-wise addition processing program 903 may choose, as target physical parcels, physical parcels on which the data SWAP process has not been implemented from physical parcels in all drives in the cycle mapping table 805 in ascending order of PDEV# and Parcel#.

Next, the cycle-wise addition processing program 903 determines whether a target physical parcel is a SWAP target (Step S1904). Specifically, the Current table of the cycle mapping reverse translation table 806 referred to by the addition-target DPG is referred to, and in a case in which there is a difference in Local Vchunk# and VDEV# including the target physical parcel, the target physical parcel is a SWAP target.

Furthermore, a physical parcel acquired by referring to the Target table by using, as keys, Local Vchunk# and VDEV# including the SWAP target physical parcel in the Current table is a SWAP destination pair.

In a case in which it is determined that the target physical parcel is not a SWAP target (No at Step S1904), the cycle-wise addition processing program 903 proceeds to Step S1910. Step S1910 is mentioned later.

In a case in which it is determined that the target physical parcel is a SWAP target (Yes at Step S1904), the cycle-wise addition processing program 903 selects, as a target Vchunk pair, two Vchunks to which a SWAP target pair is allocated, and sequentially selects virtual stripes in the target Vchunk pair as target stripe pairs (Step S1905).

Next, the cycle-wise addition processing program 903 implements the data SWAP process on the target stripe pair (Step S1906). The data SWAP process is similar to a process depicted in Patent Document 1. In a case in which at least one of the target stripe pair has valid data stored therein, the data SWAP process replaces data in the target stripe pair with each other. For example, in a case in which at least one virtual stripe in the target stripe pair is allocated to a VVOL page, the data SWAP process stages data from a physical stripe corresponding to the virtual stripe in Current to a target cache slot corresponding to the VVOL page, hinders destage of the target cache slot (writing from the CM 214 to the physical storage drive 107), and sets the target cache slot to dirty. If the destage hindrance is cancelled after the data SWAP process, data stored in the target cache slot is destaged to a physical stripe corresponding to the virtual stripe in Target asynchronously.

Next, the cycle-wise addition processing program 903 determines whether there is a stripe on which the data SWAP process has not been performed (un-SWAPPed area) in the target physical parcel (Step S1907). In a case in which there is an un-SWAPPed area (No at Step S1907), the cycle-wise addition processing program 903 returns to Step S1903 and implements a similar process on the next physical stripe in the target physical parcel.

In a case in which it is determined that there are no un-SWAPPed areas (Yes at Step S1907), the cycle-wise addition processing program 903 updates information of the Changing cycle mapping table 805 to parcel information after SWAP. Thereby, even in a case in which the VP translation process (mentioned later) is implemented on a target cycle# of the cycle-wise addition process, it becomes possible to access the correct physical parcel.

Next, the cycle-wise addition processing program 903 cancels the destage hindrance of the target cache slot for which the destage hindrance has been enabled at Step S1906 (Step S1909).

Next, the cycle-wise addition processing program 903 determines whether or not all physical parcels in the addition-target cycle mapping table 805 have been selected as target physical parcels (Step S1910). In a case in which there is an unselected physical parcel (No at Step S1910), the cycle-wise addition processing program 903 returns to Step S1903 and selects the next target physical parcel.

Note that the SWAP target physical parcel may be decided as desired according to an I/O process or the like. Typically, data allocation to an area for which the data SWAP process has not been implemented cannot be performed, but, for example, it may be allowed to perform data allocation to an added area immediately by performing, in a prioritized manner, the data SWAP process on physical parcels corresponding to an area for which a Write request has been given from a host.

In this case, the Write data may be retained as dirty data on a cache memory during the data SWAP process on the target area, and destage of the drive may be permitted at the time point when the data SWAP process on the target area has been completed.

In a case in which there are no unselected physical parcels (Yes at Step S1910), the cycle-wise addition processing program 903 updates the cycle map version entry of the cycle in the cycle map pointer table 804 to Target (Step S1911).

Next, the drive addition processing program 901 permits allocation of a Vchunk corresponding to the target drive to a virtual volume and ends the process (Step S1912). The permission of allocation specifically increases the value of the allocatable Vchunk count 1003 related to corresponding VPG# in the pool administration table 802. By implementing the SWAP process for each cycle and implementing the permission of allocation of a Vchunk to a virtual volume for each cycle, it becomes possible to make part of the added capacity available serially before the completion of the entire addition process.

Note that, whereas data allocation to the added area is permitted after the data SWAP process of the entire cycle has been completed in the example in this figure, every time data SWAP of a given area in a cycle is completed, data allocation to the area may be permitted. Thus, the added capacity becomes available in units of smaller capacities.

According to the cycle-wise addition process mentioned above, in a case in which valid data is stored in a Vchunk corresponding to a SWAP target physical parcel, the storage controller 202 reads out the valid data from the physical parcel corresponding to the Vchunk on the basis of Current, and writes the valid data in a physical parcel corresponding to the Vchunk on the basis of Target. Thus, the storage controller 202 can move data according to a change of the mapping pattern from Current to Target.

Note that, in the cycle-wise addition process, instead of sequentially selecting physical parcels, the storage controller 202 may sequentially select virtual chunks or virtual parcels.

Figure 22:
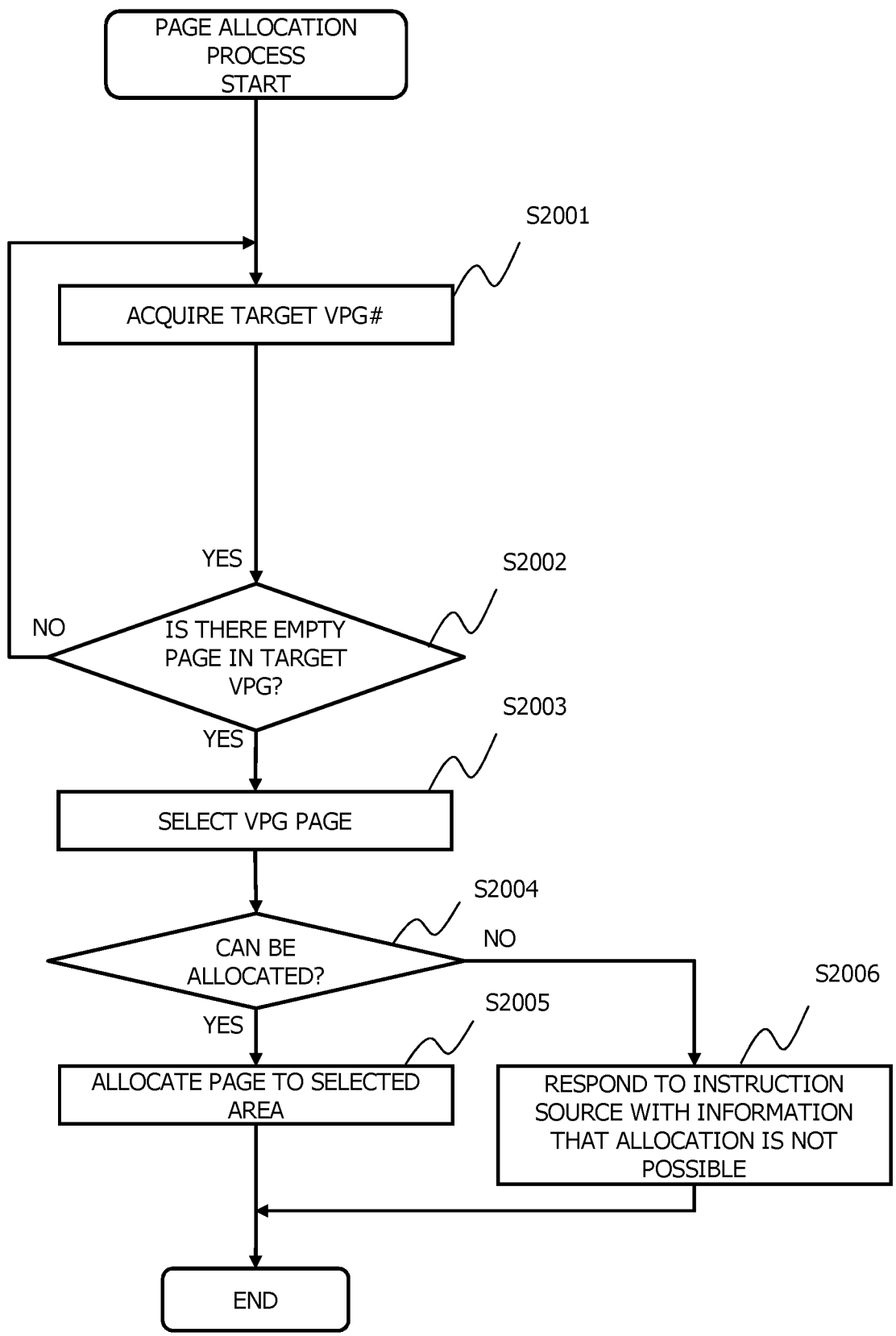
FIG. 22 is a flowchart depicting an allocation process implemented in the storage system in FIG. 2.

FIG. 22 depicts the page allocation process.

As part of a write process requested by a host 204, the page allocation processing program 904 executes the page allocation process in a case in which a VPG page has not been allocated to a write-target VVOL page.

On the basis of the page mapping table 803, the page allocation processing program 904 determines whether a VPG page has been or has not been allocated to the target VVOL page. In a case in which a VPG page has not been allocated to the target VVOL page, information such as "unallocated" or "Not-Allocate" is stored in a field of VPG# 1105 in the page mapping table 803, and so the page allocation processing program 904 can determine whether or not a VPG page has not been allocated to the target page. In the initial state of the system (the state where a host I/O has not been executed even once on a virtual volume 302), all pages in the virtual volume 302 are "unallocated (Not-Allocate)."

First, the page allocation processing program 904 acquires target VPG# (Step S2001). In a method of choosing a target VPG, for example, a VPG having the lowest use rate is selected as the target VPG. Alternatively, allocation priorities are set for VPGs for each VVOL, and a VPG having the highest allocation priority is selected as the target VPG.

Next, the page allocation processing program 904 determines whether or not there is an empty page in the target VPG (Step S2002). Here, the page allocation processing program 904 refers to the page mapping table 803 and determines whether there is an unallocated VPG page 1105 in the target VPG.

In a case in which there are no empty pages (NO at Step S2002), the page allocation processing program 904 returns to Step S2001, selects different target VPG#, and implements the determination at Step S2002 again. In a case in which there is an empty page (YES at Step S2002), the page allocation processing program 904 selects a target VPG page from the target VPG (Step S2003). In a method of choosing the target VPG page, for example, a page with the smallest VPG page# in empty pages in the target VPG is selected as the target VPG page.

In a case in which a target VPG page could not be selected even if the processes above are executed on all VPGs (NO at Step S2004), the page allocation processing program 904 responds with information that allocation is not possible to the instruction source of the page allocation process (Step S2006), and ends the process.

In a case in which a target VPG page could be selected (YES at Step S2004), the page allocation processing program 904 registers the target VPG page in an entry of a target VVOL page in the page mapping table in order to allocate the target VPG page to the VVOL page (Step S2005), and ends the process.

According to the page allocation process mentioned above, the storage controller 202 can efficiently use the VPG space by allocating a necessary VPG page to a VVOL page. In addition, because it is not necessary to make units of data of host access and units of distributed RAID the same, both the host access and the distributed RAID can be performed efficiently.

Note that the storage controller 202 may provide the VPG space to a host 204, instead of the VVOL space. In this case, the storage controller 202 may not use the page mapping table.

Figure 23:
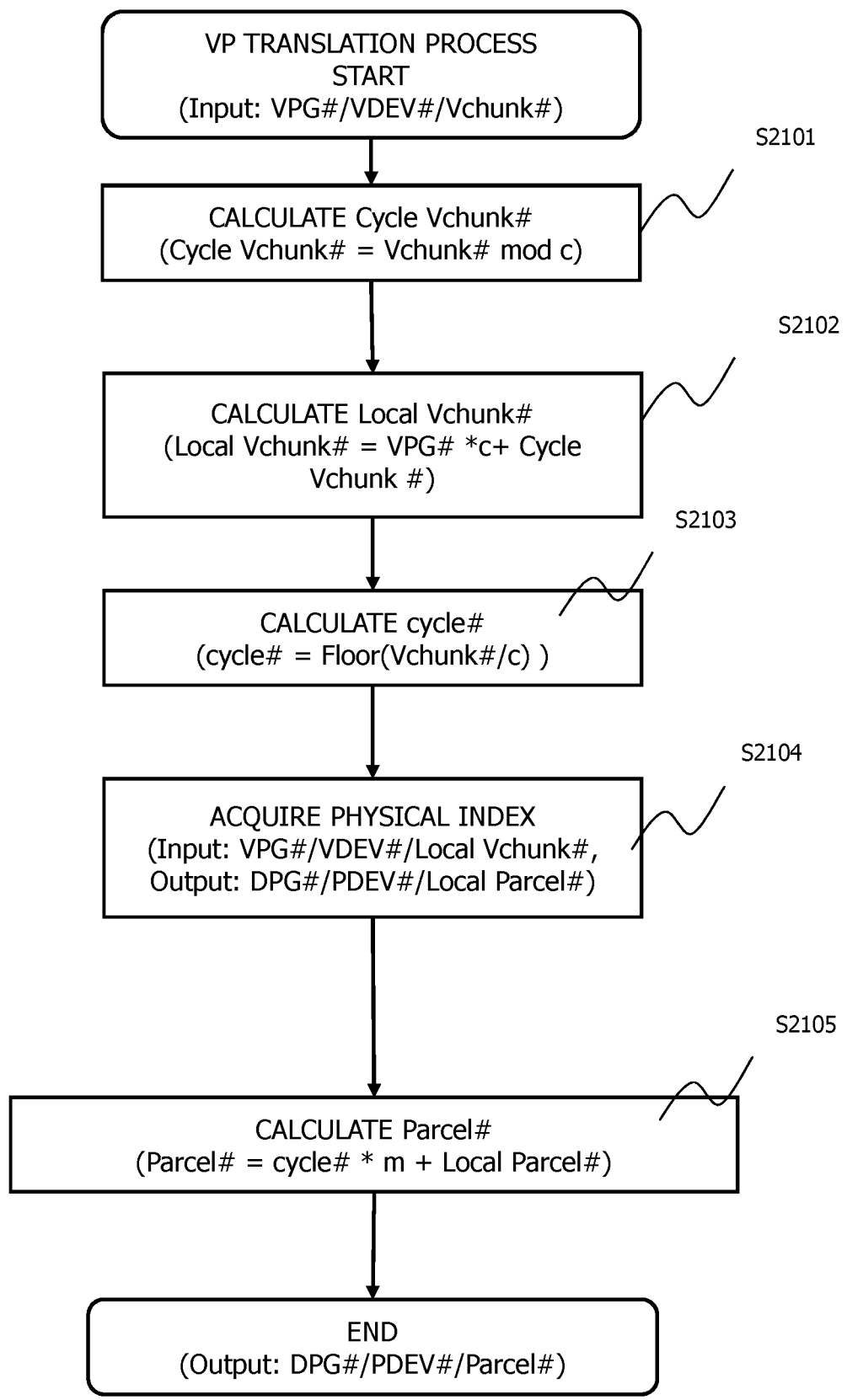
FIG. 23 is a flowchart depicting a VP translation process implemented in the storage system in FIG. 2.

FIG. 23 depicts the VP translation process.

The virtual-physical (VP) translation process is executed by the VP translation processing program 905. The VP translation is a process of translating an address of a logical storage area into an address of a physical storage area. The VP translation process is called by a page translation process performed in a case in which an I/O request is received from a host 204, or the like. The page translation process translates an address in a virtual volume specified by an I/O request into a VPG-space address. The VP translation process translates a VPG-space address (VPG#, VDEV#, and Vchunk#) which is a specified virtual address into a DPG-space address (DPG#, PDEV#, and Parcel#) which is the physical data storage destination.

First, the VP translation processing program 905 calculates Cycle Vchunk# from Vchunk# (Step S2101). Cycle Vchunk# can be calculated according to:

Cycle Vchunk#=Vchunk# mod $c$

Next, the VP translation processing program 905 calculates Local Vchunk# from VPG#, Cycle Vchunk# and a cycle Vchunk count C (Step S2102). Local Vchunk# can be calculated according to:

Local Vchunk#=VPG#×C+Cycle Vchunk#

Next, the VP translation processing program 905 calculates cycle# from Vchunk# (Step S2103). cycle# can be calculated according to:

cycle#=Floor(Vchunk#/$c$)

Next, the VP translation processing program 905 executes a physical index acquisition process (Step S2104).

The physical index acquisition is a process of acquiring DPG#, PDEV#, and Local Parcel# by using VPG#, VDEV#, and Local Vchunk# as input.

For example, the VP translation processing program 905 acquires DPG# from VPG# by using the PG mapping (V2P) table 807.

Next, the VP translation processing program 905 refers to the cycle map pointer table 804, identifies the cycle map version 1203 by using DPG# and cycle# as keys, and decides a table in the cycle mapping table 805 to be referred to.

Next, the VP translation processing program 905 acquires PDEV# and Local Parcel# from VDEV# and Local Vchunk# by using the cycle mapping table 805.

Next, the VP translation processing program 905 calculates Parcel# from Local Parcel#, Cycle#, and a cycle Parcel count m, and ends the process (Step S2105). Parcel# can be calculated according to:

Parcel#=Cycle#*$m$+Local Parcel#

Figure 24:
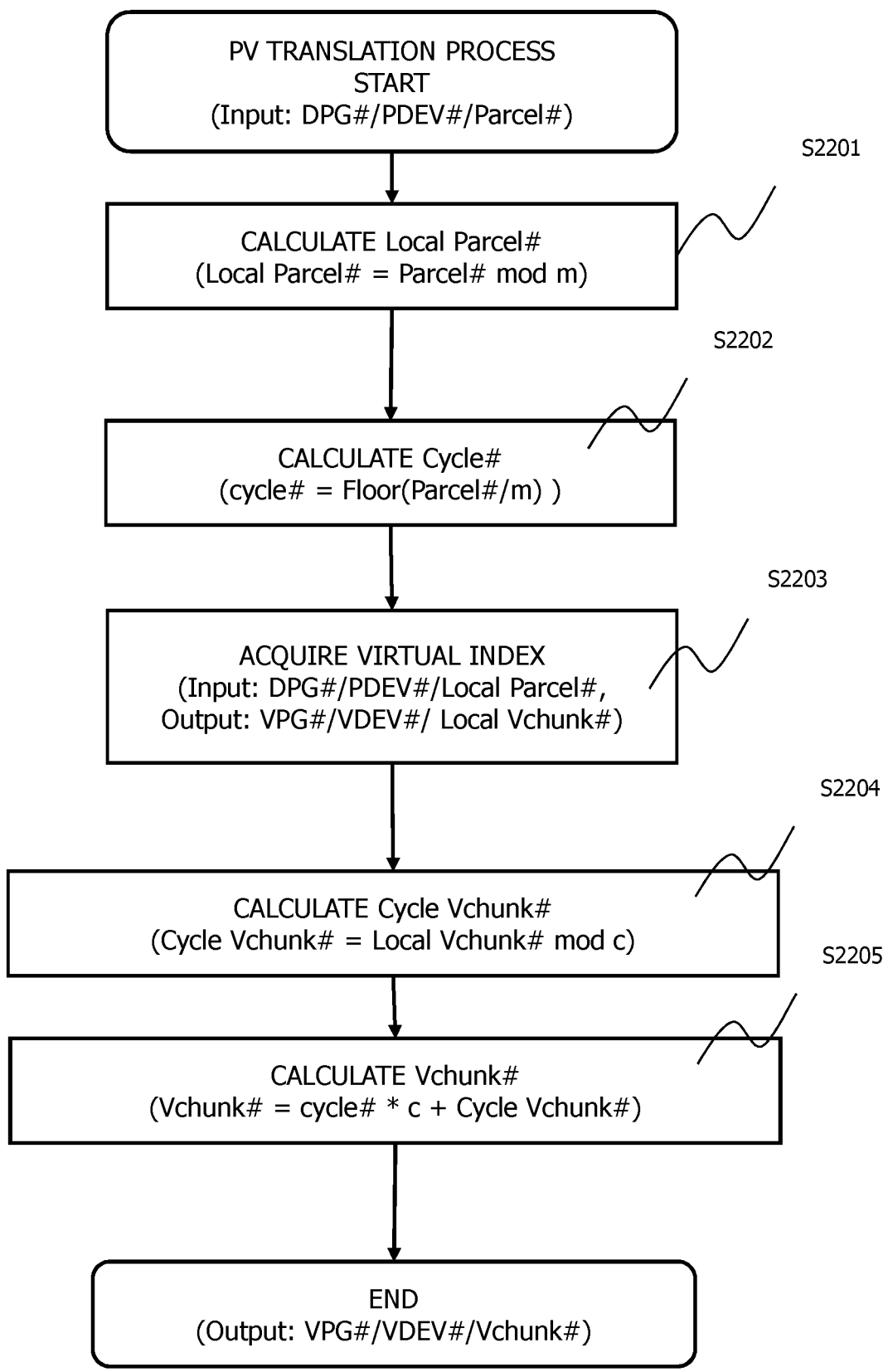
FIG. 24 is a flowchart depicting a PV translation process implemented in the storage system in FIG. 2.

FIG. 24 depicts the PV translation process.

The physical-virtual (PV) translation process is executed by the PV translation processing program 906. The PV translation is a process of translating information regarding a physical storage area into information regarding a logical storage area. For example, the PV translation is a process used for identifying data corresponding to a physical storage area that has malfunctioned in a rebuild process or for other purposes. In the PV translation, a DPG-space address (DPG#, PDEV#, and Parcel#) which is a specified physical data storage destination is translated into a VPG-space address (VPG#, VDEV#, and Vchunk#) which is a virtual address. The PV translation corresponds to a reverse-translation of the VP translation. That is, if the VP translation is implemented, and then the PV translation is implemented on the basis of the result of the VP translation, the same address is returned, and vice versa.

First, the PV translation processing program 906 calculates Local Parcel# from Parcel# (Step S2201). Local Parcel# can be calculated according to:

Local Parcel#=Parcel# mod($m$)

Next, the PV translation processing program 906 calculates cycle# from Parcel# (Step S2202). cycle# can be calculated according to:

cycle#=Floor(Parcel#/$m$)

Next, the PV translation processing program 906 refers to the cycle map pointer table 804, identifies the cycle map version 1203 by using DPG# and cycle# as keys, and decides a table in the cycle mapping table 805 to be referred to.

Next, the PV translation processing program 906 executes virtual index acquisition (Step S2203).

The virtual index acquisition is a process of acquiring VPG#, VDEV#, and Local Vchunk# by using DPG#, PDEV#, and Local Parcel# as input.

For example, the PV translation processing program 906 acquires VPG# from DPG# by using the PG mapping (P2V) table 808, and acquires VDEV# and Local Vchunk# from PDEV# and Local Parcel# by using the cycle mapping reverse translation table 806. Note that, in this translation, in a case in which VDEV# and Local Vchunk# have not been allocated, this represents that the Parcel is a spare area, and data has not been allocated.

Next, the PV translation processing program 906 calculates Cycle Vchunk# from Local Vchunk#, Cycle#, and a cycle Vchunk count C. Cycle Vchunk# can be calculated according to:

Cycle Vchunk#=Local Vchunk# mod $c$

Next, the PV translation processing program 906 calculates Vchunk# from Cycle Vchunk#, Cycle#, and the cycle Vchunk count C, and ends the process (Step S2205). Vchunk# can be calculated according to:

Vchunk#=Cycle#*C+Cycle Vchunk#

According to the PV translation process mentioned above, in the rebuild process, the storage controller 202 can translate a DPG-space address of a physical storage drive 107 experiencing a failure into a VPG-space address, and identify data necessary for the rebuild.

Note that, whereas the single-drive addition method is explained in the present embodiment, a similar way of thinking can also be used to perform a single-drive reduction process.

At a time of reduction, first, a new Write in a removal-target drive is prohibited, and then data stored on the removal-target drive is migrated to a drive other than the removal target. Thereafter, the method depicted in FIG. 18 is executed in reverse to thereby generate a mapping pattern after the reduction. After the generation of the mapping pattern after the reduction, the cycle-wise addition process in FIG. 21 is implemented, the cycle-wise addition process is completed on all cycles, and then the removal-target drive is removed from the system.

In addition, whereas the method of drive addition from N drive to N+1 drives is explained in the present embodiment, a similar way of thinking can be used to also create mapping in a case in which a DPG including N+1 drives is created newly. For example, supposing that the VPG width is K, a mapping pattern of a DPG having the K-drive configuration is created in advance, and mapping patterns of K+1 drives, K+2 drives, . . . , are created serially. Thus, a mapping pattern of N+1 drives can be obtained in the end.

In addition, whereas there is data in existing drive areas in the example depicted in the present embodiment, some processes may not be implemented when data is not stored in a case in which a DPG is configured newly or in other cases. For example, data can be stored without implementing Step S1903 to Step S1910 in FIG. 19.

According to the data movement method to be performed at a time of single-drive addition depicted in the present embodiment, it becomes possible to use an added capacity with a data movement amount equal to or smaller than the capacity to be added by the addition. In addition, it becomes possible to pursue both higher speeds of rebuilds in the distributed RAID scheme and high availability due to acquisition of DE-failure tolerance.

Second Embodiment

Next, a second embodiment which is different in terms of the data movement method to be performed at a time of single-drive addition is depicted. In the explanation below, mainly, differences from the first embodiment are explained by use of the first embodiment as the basis.

Figure 25:
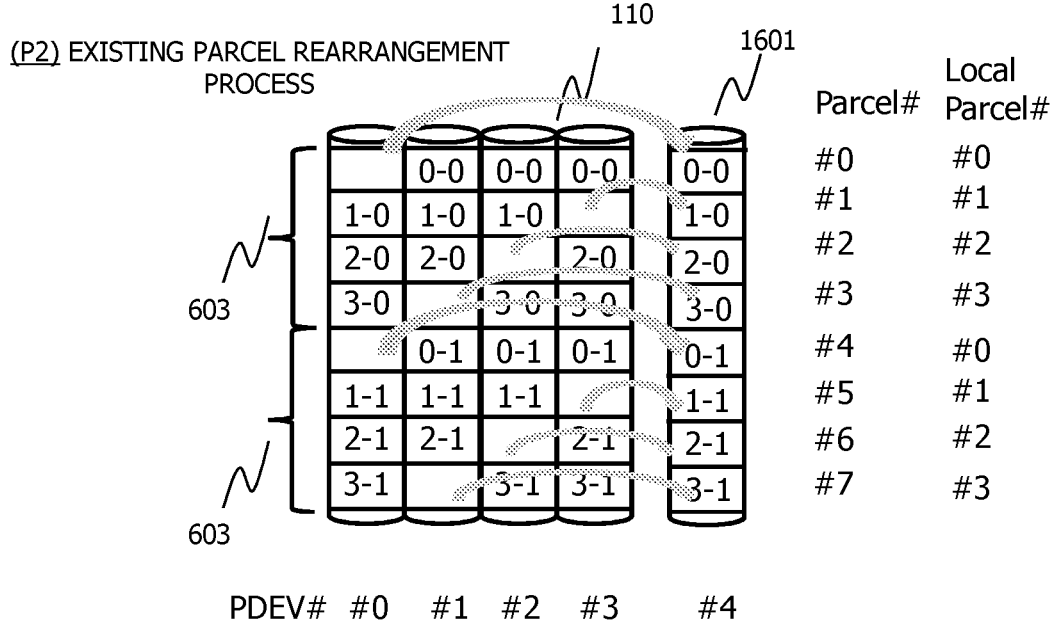
FIG. 25 is a block diagram depicting a parcel mapping method implemented at a time of addition of one physical storage drive used in the storage system according to a second embodiment.
Figure 25:
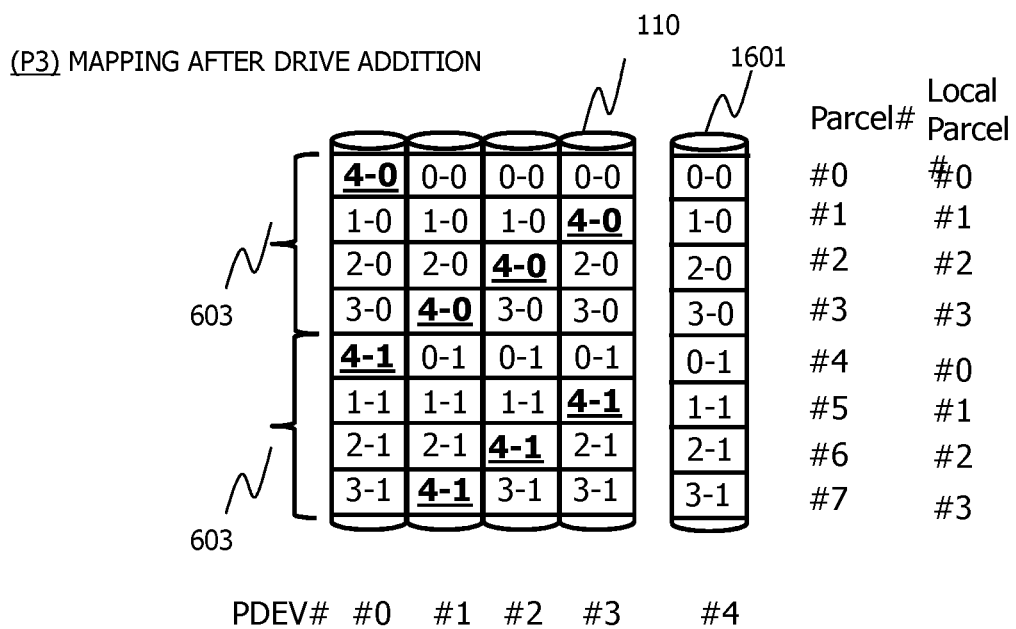

FIG. 25 depicts another mapping pattern creation method in a drive-wise addition process.

In the example depicted here, in the configuration with cycle Parcel count m=4, and drive count N=4, the drive count which has been four is increased by adding one drive, and the drive count is changed to five. The example is depicted by using only differences from FIG. 18. P1 representing the current mapping pattern which is the initial mapping pattern before the drive addition is the same as that in FIG. 18, and is omitted.

P2 depicts a mapping pattern during the drive addition. Some of Parcels 108 included in the existing Vchunks 101 are allocated to the added drive 1601. Accordingly, in the existing physical storage drives 107, there are now Parcels which are not mapped to the Vchunk 101. Whereas, in the example in this figure, Parcels 108 to be moved are selected each from one of four physical storage drives 107 in the existing four physical storage drives 107, and four Parcels in total are moved, the movement amount depends on the cycle Parcel count, the number of reserved parcels in a cycle Parcel, and the number of Parcels included in a Vchunk. If the cycle Parcel count is m, the number of reserved parcels in a cycle Parcel is S, and the VPG drive count is K, the movement amount T is expressed by the following formula.

$T=K\times(m-s)/K=(m-s)$

In comparison with the example depicted in FIG. 18, this is different in that the movement amount is increased.

In P3, new Vchunks are created. The new Vchunks include Parcels that are generated due to the existing Vchunk reconfiguration process mentioned before and are not mapped to Vchunks. In comparison with the example depicted in FIG. 18, this is different in that the new Vchunks include only Parcels in the existing drives.

The number of new Vchunks depends on the cycle Parcel count, the number of reserved parcels in a cycle Parcel, and the number of Parcels included in a Vchunk. If the cycle Parcel count is m, the number of reserved parcels in a cycle Parcel is S, and the VPG drive count is K, the number V of new Vchunks is expressed by the following formula.

$V=(m-s)/K$

Note that the capacity (=V×K) of the new Vchunks is equal to the capacity (=m−s) of the added drive 1601 excluding spares.

Thereafter, the storage controller 202 performs the parcel moving process of moving data according to the mapping pattern and completes the addition process. After the completion of the parcel moving process, the storage controller 202 permits all VPG pages in the new Vchunks to be allocated to VVOL pages.

In comparison with the first embodiment, in the data movement depicted in the present embodiment, the number of Vchunks to be newly allocatable is the same, and the movement amount is increased. This data movement is used in a case in which it is desired to enhance the mapping pattern characteristics after the drive addition, rather than to attain the effect of reducing the data movement amount. The mapping pattern characteristics are, for example, the host IO performance, the distribution rebuild speed, and the like.

In addition, whereas only one Vchunk is increased per cycle mapping table in the example depicted in the present embodiment, when the cycle Parcel count m is large, and a plurality of Vchunks are increased per cycle mapping table, the parcel selection may be performed such that the movement amount becomes an intermediate movement amount between the movement amount depicted in the first embodiment and the movement amount depicted in the present embodiment. For example, when the number of Vchunks to be added is two, one Vchunk may be configured by moving seven parcels from existing PDEVs and selecting four Parcels from the existing PDEVs, and one Vchunk may be selected by selecting three from the existing PDEVs and one Parcel from the added PDEV.

Third Embodiment

Next, in the case depicted in a third embodiment, a plurality of drives which are fewer than a VPG drive count are added collectively. In the explanation below, mainly, differences from the first embodiment are explained by use of the first embodiment as the basis.

Figure 26:
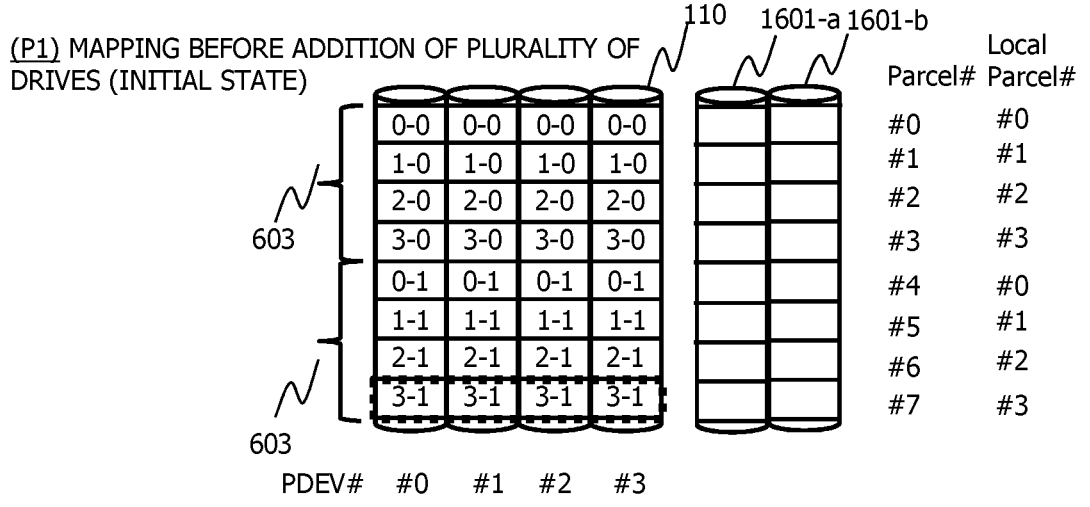
FIG. 26 is a block diagram depicting an example of a parcel mapping method implemented at a time of addition of a plurality of physical storage drives used in the storage system according to a third embodiment.
Figure 26:
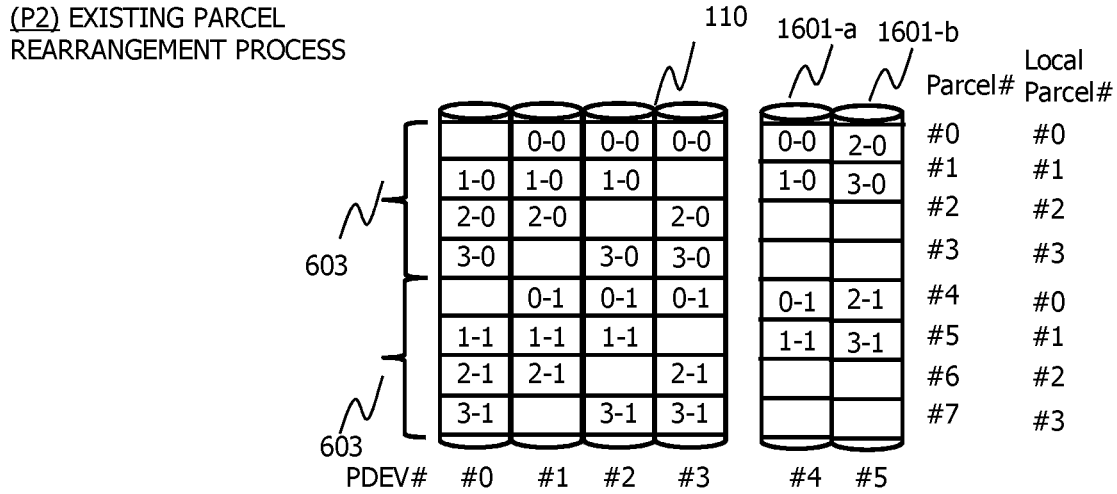
Figure 26:
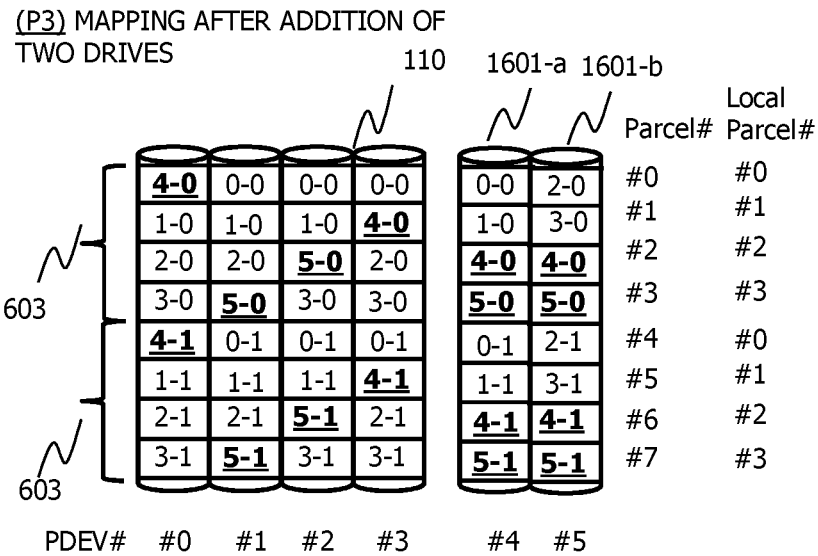

FIG. 26 depicts a mapping pattern creation method in a process of adding a plurality of drives which are equal to or fewer than a VPG drive count.

Whereas operation of single-drive addition is repeated multiple times to thereby generate a mapping pattern after multiple-drive addition at a time of the multiple-drive addition in the first embodiment, in the present embodiment, drives to be added are selected, as movement-source drives, in an amount larger than the number of existing drives to thereby reduce the movement amount at a time of the addition than an amount in a case in which single-drive addition is repeated multiple times.

P1 depicts a current mapping pattern which is the initial mapping pattern before the drive addition. Note that, in the example in this figure, only two Parcel cycles 603 are depicted for simplification. Because data redundancy is not possible only with an added drive area in this state, the storage controller 202 cannot store data yet. In this figure, two added drives 1601-a and 1601-b are added collectively.

P2 depicts a mapping pattern during the drive addition. Some of Parcels 108 included in the existing Vchunks 101 are allocated to the added drives 1601. Thereby, in the existing physical storage drives 107, there are now Parcels which are not mapped to the Vchunk 101. Whereas, in the example in this figure, Parcels 108 to be moved are selected each from one of four physical storage drives 107 in the existing four physical storage drives 107, and four Parcels in total are moved to the two added drives 1601-a and 1601-b per cycle map, the movement amount depends on the cycle Parcel count, the number of reserved parcels in a cycle Parcel, the number of Parcels included in a Vchunk, and the added-drive count. If the cycle Parcel count is m, the number of reserved parcels in a cycle Parcel is S, the VPG drive count is K, and the added-drive count is A, the movement amount T is expressed by the following formula.

$$T=(K-A)\times(m-s)/K\times A$$

Here, A is an integer equal to or larger than one and smaller than K, and it is clear that the value of T is small in comparison with the first embodiment.

Figure 27:
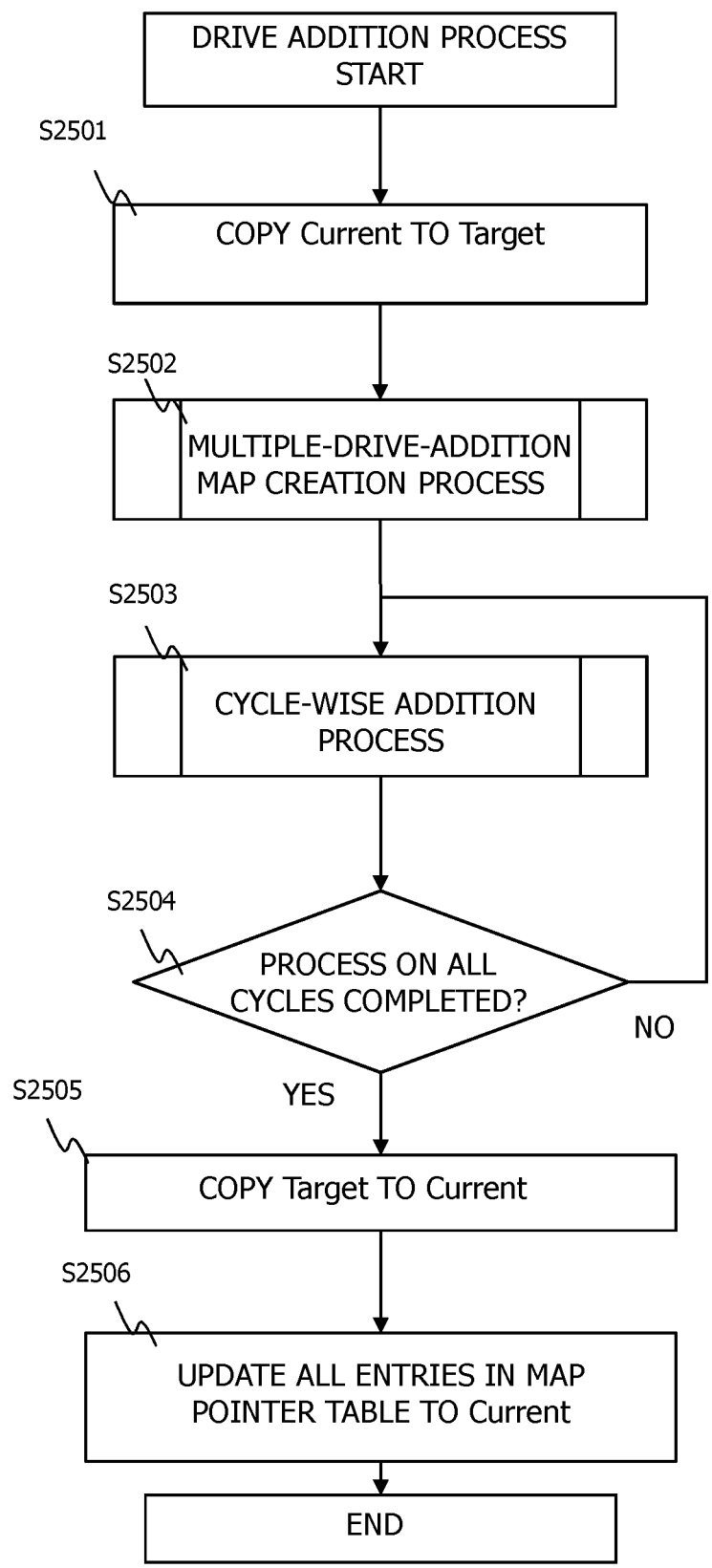
FIG. 27 is a flowchart depicting an example of a drive addition process that can be applied at a time of addition of a plurality of physical storage drives used in the storage system according to the third embodiment.

FIG. 27 depicts the drive addition process in the third embodiment.

This is different from the drive addition process in the first embodiment depicted in FIG. 19 in that a series of processes from Step S1702 to Step S1704 is replaced with a multiple-drive-addition map creation process (Step S2502) and is similar to the first embodiment in terms of the other processes.

Figure 28:
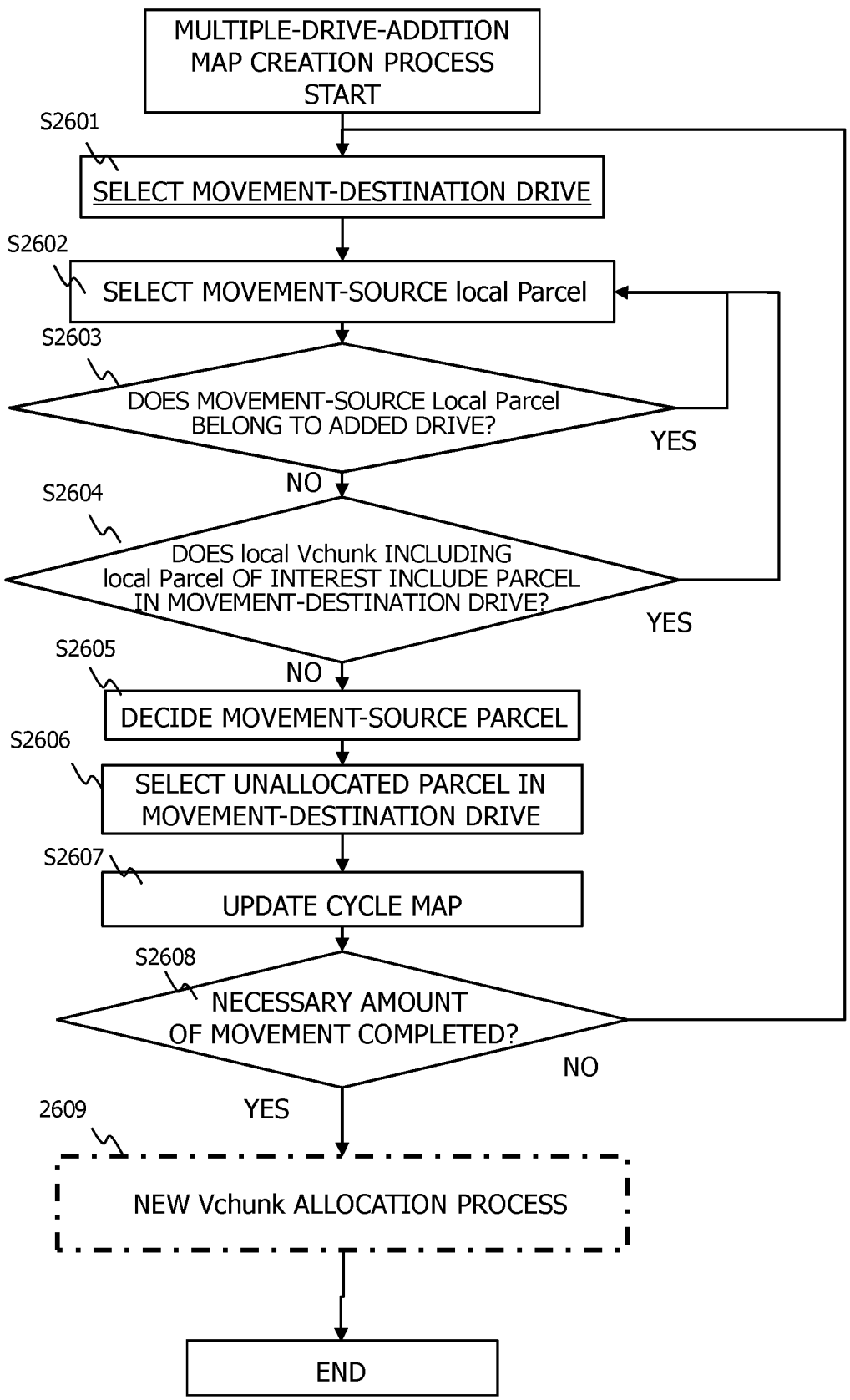
FIG. 28 is a flowchart depicting a multiple-drive-addition map creation process in FIG. 25.

FIG. 28 depicts the multiple-drive-addition map creation process (Step S2502).

First, the drive addition processing program 901 selects, as a movement-destination drive, one drive from a plurality of added drives 1601 (Step S2601). Although selection criteria are not limited particularly, for example, drives may be selected in ascending order of drive IDs from the added drives 1601 or may be selected randomly by using random numbers or the like. Drives may be selected such that the numbers of times of selection become even between the added drives.

Next, the drive addition processing program 901 selects a movement-source Local Parcel (Step S2602). The present process is the same as in the first embodiment.

Next, the drive addition processing program 901 determines whether the selected Local Parcel belongs to an added drive (S2603). Accordingly, data movement between the added drives can be prevented, and this contributes to reduction of the data movement amount.

The following Step S2604 to Step S2607 are similar to the first embodiment.

Next, the drive addition processing program 901 determines whether a sufficient amount of existing parcels has been moved (Step S2608). In a case in which the number of parcels moved to the added drives is smaller than T which is the movement amount mentioned before (No at Step S2608), the drive addition processing program 901 returns to Step S2601 and performs the process.

If the cycle Parcel count is m, the number of reserved parcels in a cycle Parcel is S, the VPG drive count is K, and the added-drive count is A, the movement amount T in the present embodiment is expressed by the following formula.

$$T=(K-A)\times(m-s)/K\times A$$

In a case in which the number of parcels moved to the added drives is equal to or larger than T which is the movement amount mentioned before (Yes at Step S2608), the drive addition processing program 901 proceeds to the new Vchunk allocation process 1802. The following new Vchunk allocation process is similar to the first embodiment.

Fourth Embodiment

Next, in the case depicted in a fourth embodiment, a plurality of drives which are equal to or more than a VPG drive count are added collectively. In the explanation below, mainly, differences from the first embodiment are explained by use of the first embodiment as the basis.

Figure 29:
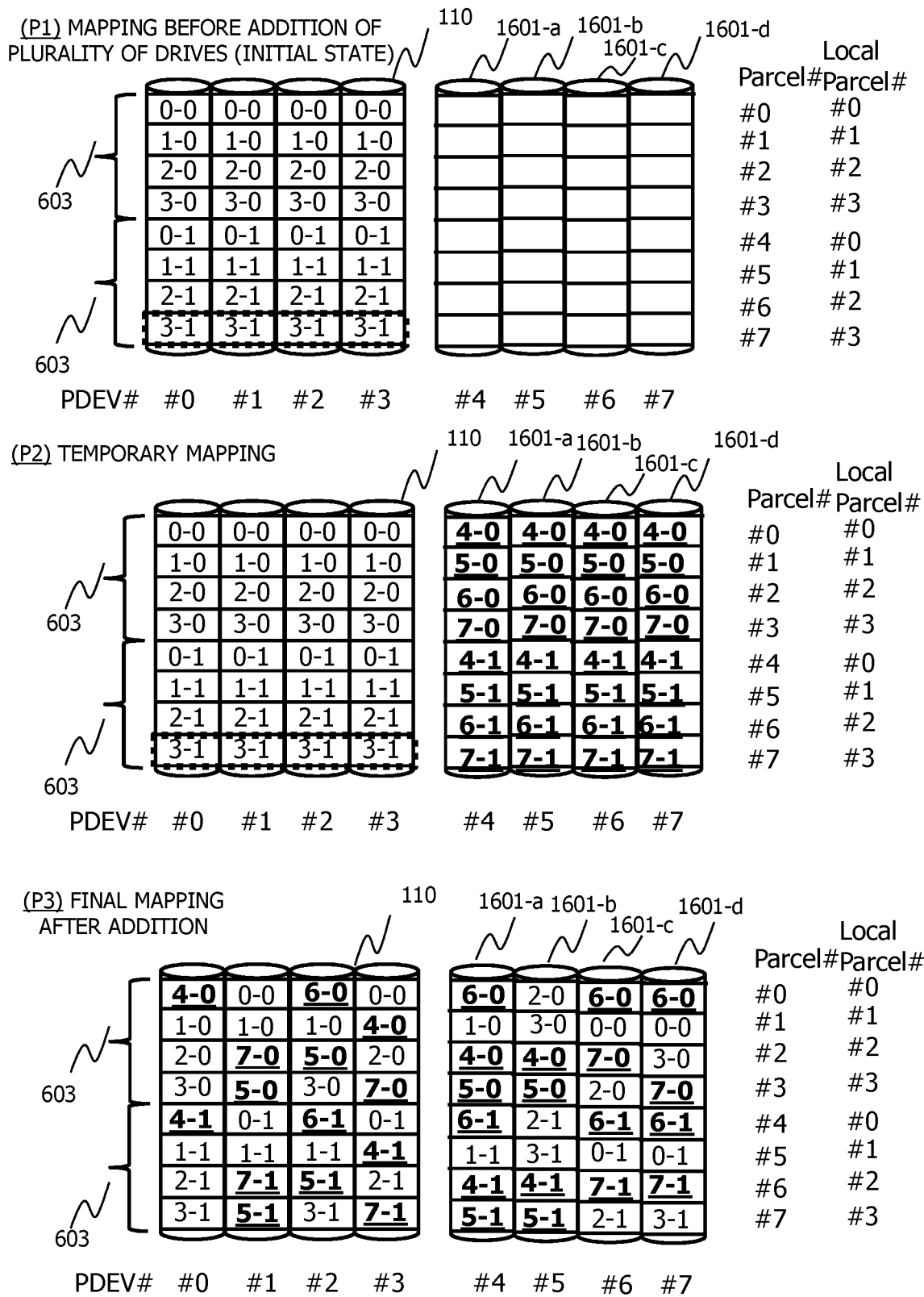
FIG. 29 is a block diagram depicting an example of a parcel mapping method implemented at a time of addition of a plurality of physical storage drives used in the storage system according to a fourth embodiment.

FIG. 29 depicts a mapping pattern creation method in a process of adding a plurality of drives which are equal to or fewer than a VPG drive count.

To use an added capacity after making data redundant at a time of addition of drives which are fewer than a VPG drive count, it is essential to move data from existing drives. However, in a case in which drives which are equal to or more than a VPG drive count are to be added simultaneously, data redundancy is possible only with the added drives, and so it is possible to use the capacity without data movement. A mapping pattern creation method for using the added capacity without data movement is mentioned in the present embodiment.

P1 depicts a current mapping pattern which is the initial mapping pattern before the drive addition. Note that, in the example in this figure, only two Parcel cycles 603 are depicted for simplification. Because data redundancy is not possible only with an added drive area in this state, the storage controller 202 cannot store data yet. In this figure, four added drives 1601-a to 1601-d are added collectively.

P2 depicts a temporary mapping pattern to be used temporarily. Parcels 108 included in existing Vchunks 101 are not moved, but new Vchunks include only parcels of the added drives 1601. Accordingly, movement of existing data becomes unnecessary, so that the added capacity becomes available immediately. On the other hand, because the number of drives where parcels in Chunks are distributed is restricted, the effect of enhancing the rebuild speed attained by the distributed RAID configuration lowers undesirably. For example, in a case in which PDEV#0 malfunctions, PDEV#1 to #3 are the only drives from which data is read in the rebuild process, and data is not read out from PDEV#4 to #7.

In view of this, the arrangement in P2 is temporary, and rearrangement is performed in the end to realize mapping that provides a high distribution rebuild effect (P3). Accordingly, arrangement that provides a high rebuild speed is realized in the end while the added capacity is made available immediately.

Figure 30:
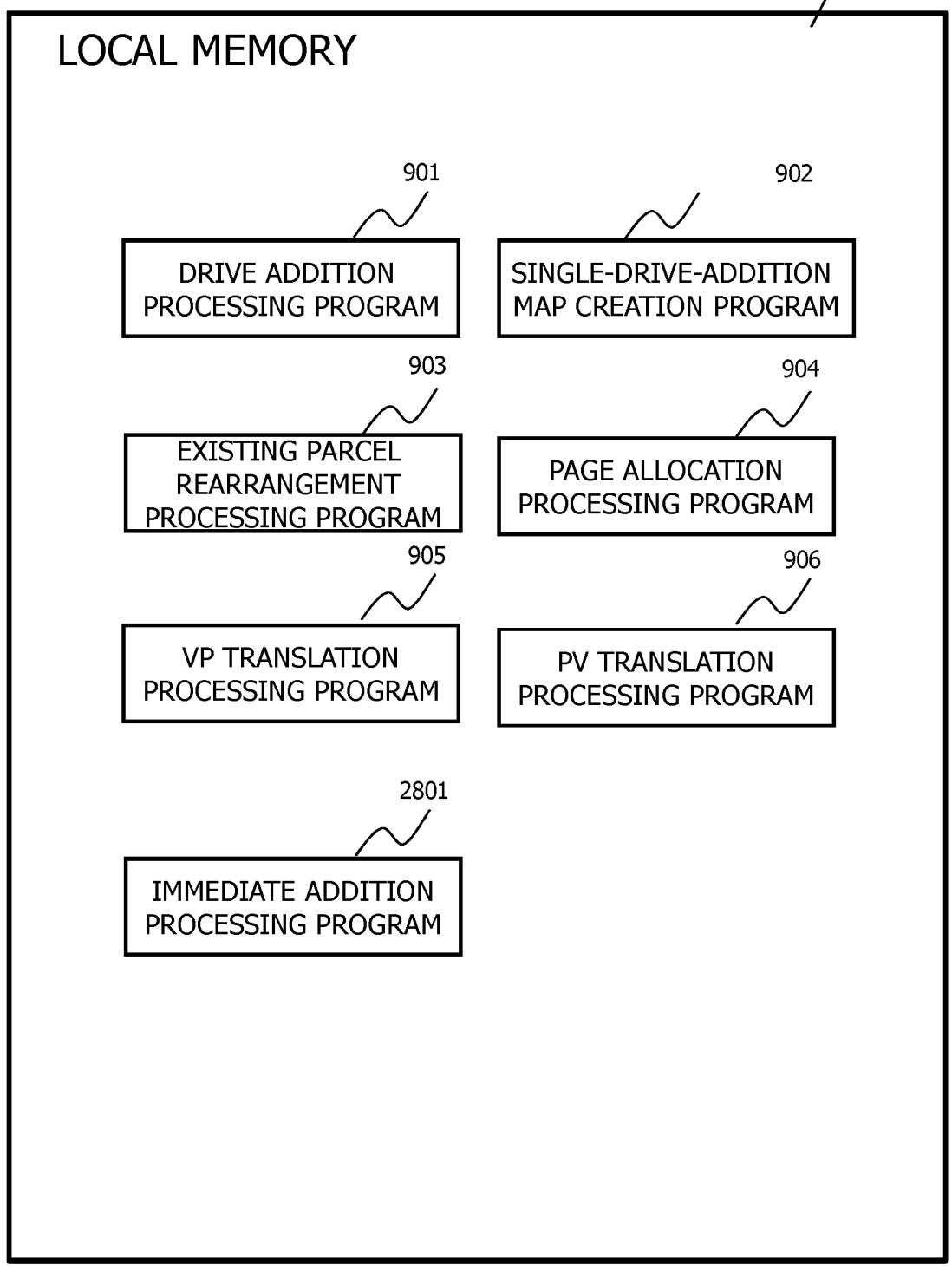
FIG. 30 is a block diagram depicting contents of a local memory applied to the storage system according to the fourth embodiment.

FIG. 30 depicts contents of a local memory in the present embodiment. The local memory 217 stores an immediate addition processing program 2801, in addition to the programs depicted in the first embodiment.

Figure 31:
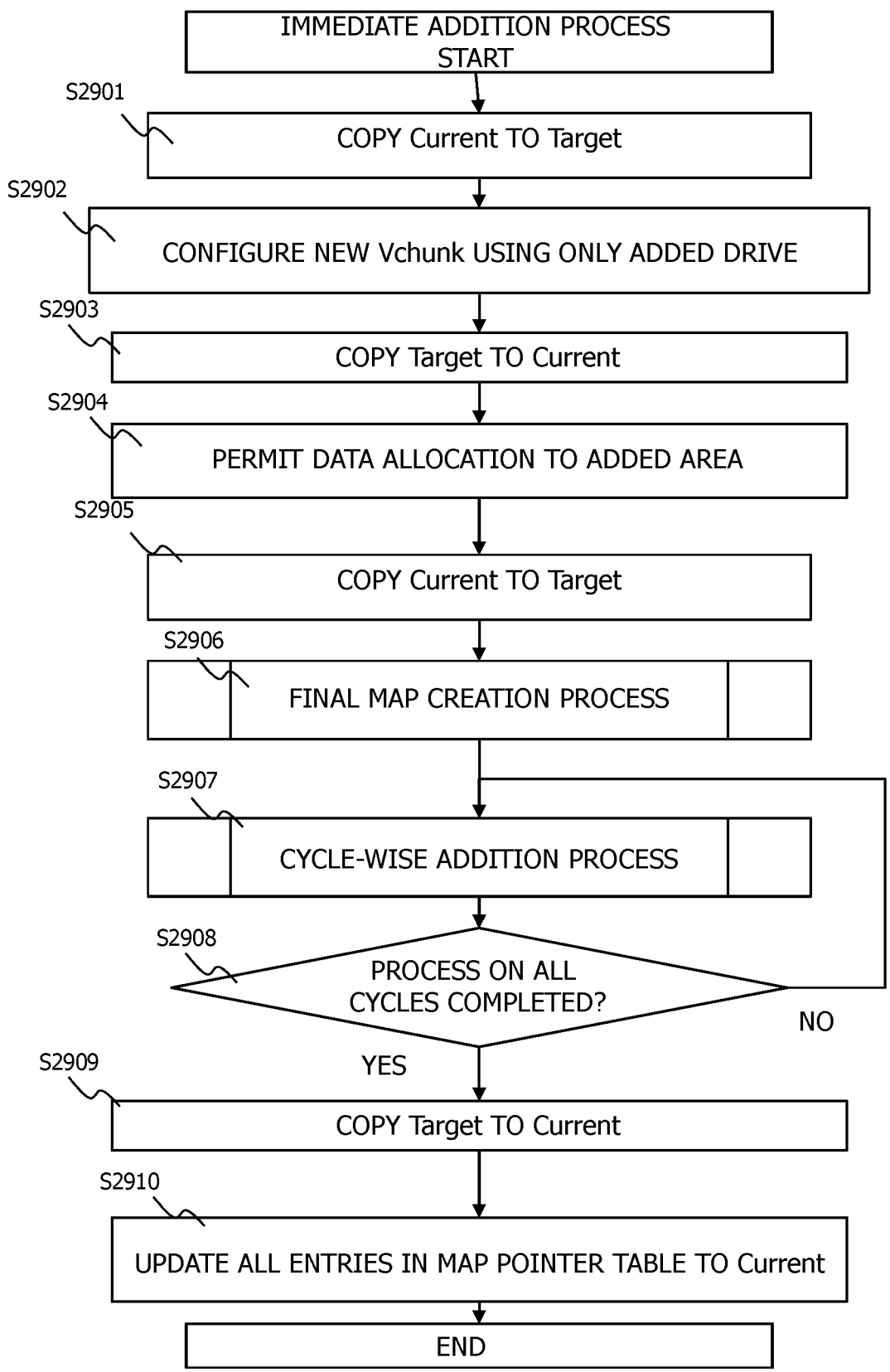
FIG. 31 is a flowchart depicting an immediate addition process implemented in the storage system according to the fourth embodiment.

FIG. 31 depicts operation of the immediate addition processing program 2801.

The immediate addition processing program 2801 performs the addition process in a case in which drives which are equal to or more than a VPG drive count are added collectively. After adding drives for addition to the system, an administrator inputs, to the administration server 203, an immediate addition instruction to a DPG. By being triggered by reception of the addition instruction from the administration server 203, the storage controller 202 executes the immediate addition process. Alternatively, by being triggered by detection of addition of the drives for addition to the system which are equal to or more than the VPG drive count, the administration server 203 or the storage controller 202 may execute the immediate addition process automatically.

First, the immediate addition processing program 2801 copies, to the Target cycle mapping table 805, the content of the Current table of the cycle mapping table 805 (Step S2901).

Next, the immediate addition processing program 2801 configures new Vchunks by using only Parcels in the added drives 1601, and updates the Target cycle mapping table 805 (Step S2902).

Next, the immediate addition processing program 2801 updates the Current cycle mapping table 805 to the Target cycle mapping table (Step S2903). The only difference between before and after the update is that, in the Current cycle mapping table 805, entries of the new Local Vchunks are added and entries of the existing Local Vchunks are not updated. Accordingly, access to existing data is possible continuously before and after the update.

Next, the immediate addition processing program 2801 permits allocation of the new Vchunks to a virtual volume (Step S2904). The permission of allocation specifically increases the value of the allocatable Vchunk count 1003 related to corresponding VPG# in the pool administration table 802.

With the processes up to this point, the added capacity becomes available. The following process may be implemented continuously or may be implemented at a given timing after an intermission, or the immediate addition process may be completed without implementing the following process.

Next, the immediate addition processing program 2801 copies, to the Target cycle mapping table, the content of the Current table of the cycle mapping table 805 (Step S2905).

Next, the immediate addition processing program 2801 implements a final map creation process (Step S2906). In the final map creation process, the mapping pattern according to the DPG drive count after the addition is generated on the Target table of the cycle mapping table 805. Although the generation method is not limited, for example, the method of repeating single-drive addition like the one depicted in the first embodiment may be used to generate the mapping pattern or the multiple-drive-addition map creation process (S2502) may be used to generate the mapping pattern.

Next, the immediate addition processing program 2801 implements processes of and after the cycle-wise addition process (Step S2907). The processes of and after the cycle-wise addition process are similar to the processes of and after Step S1706 depicted in FIG. 19.

Fifth Embodiment

The computer system according to a fifth embodiment is explained below.

Figure 32:
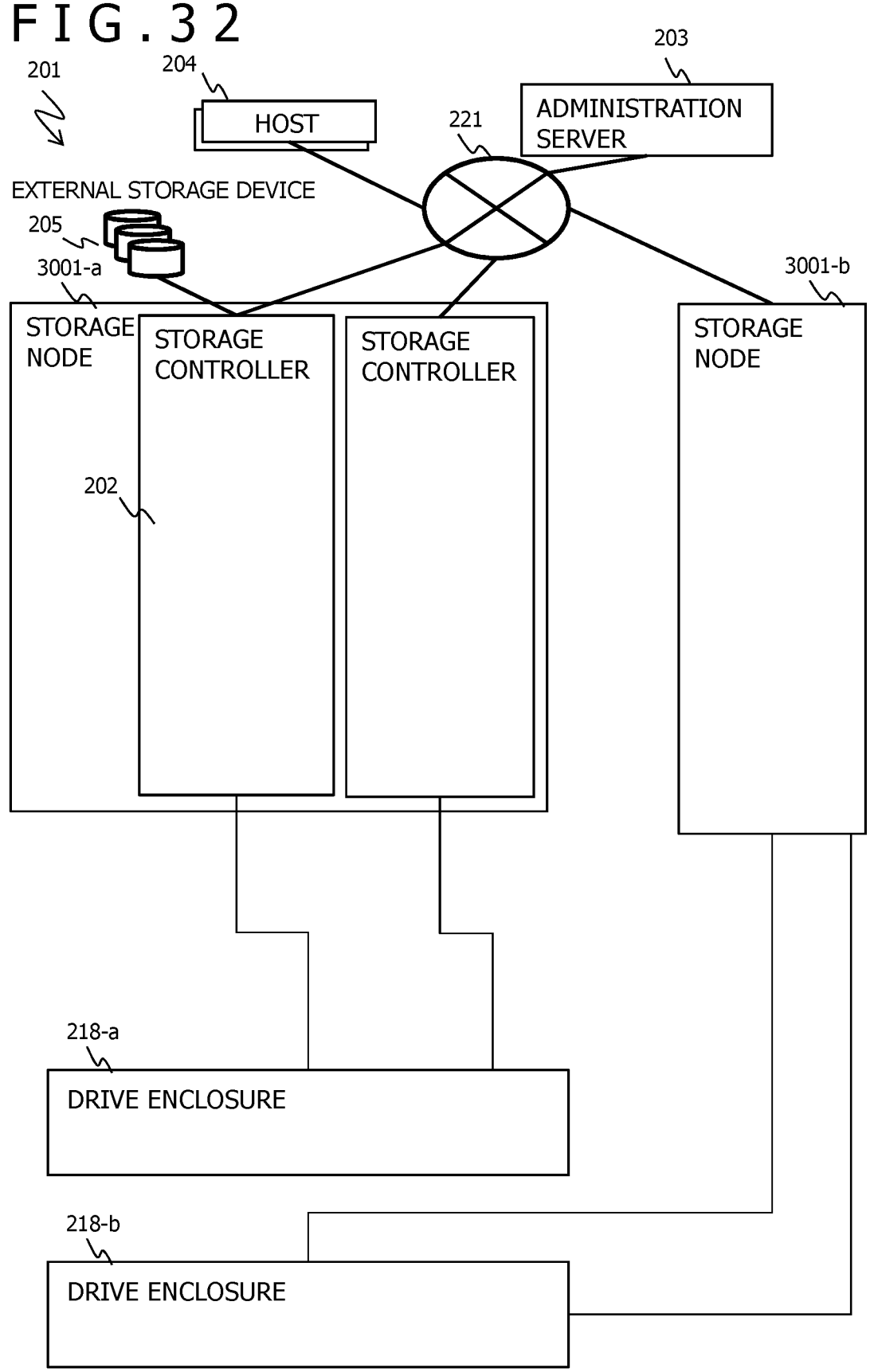
FIG. 32 is a block diagram depicting a hardware configuration example of the storage system according to a fifth embodiment.

FIG. 32 depicts the hardware configuration of the computer system according to the present embodiment.

The computer system 201 includes the one or more host computers (called hosts below) 204, the administration server 203, storage nodes 3001, the storage controllers 202 and the drive enclosures 218. The hosts 204, the administration server 203, and the storage controllers 202 are connected via the network 221.

Each storage node 3001 has a plurality of storage controllers 202.

The storage controllers 202 administer capacity pools (called pools below, simply) including storage areas of a plurality of physical storage drives 107. The storage controllers 202 configure RAID groups by using the storage areas in the pools. That is, the storage controllers 202 configure a plurality of virtual parity groups (VPG) by using a plurality of physical storage drives 107.

In the present embodiment, the storage controllers 202 may use physical storage drives in drive enclosures 218 that are connected to storage nodes 3001 different from the storage nodes 3001 including the storage controllers 202. That is, a storage controller 202 belonging to a storage node 3001-a may configure a virtual parity group by using physical storage drives in a drive enclosure 218-b. In addition, the storage controller 202 may configure a single virtual parity group by using physical storage drives in a drive enclosure 218-a and physical storage drives in the drive enclosure 218-b.

Where embodiments of the present invention are explained thus far, the embodiments above are explained in detail in order to explain the present invention in an easy-to-understand manner, and the present invention is not necessarily limited to ones including all the configurations explained. Some of the configurations of an example can be replaced with configurations of another example, and configurations of an example can also be added to the configurations of another example. In addition, some of the configurations of each embodiment can additionally have other configurations, be deleted or be replaced with other configurations. Depicted configurations in the figures are ones that are considered to be necessary for explanation, and all configurations for products are not necessarily depicted.

In addition, some or all of configurations, functionalities, processing sections, processing means or the like described above may be realized by hardware by designing them on an integrated circuit and so on, for example. In addition, the present invention can also be realized by software program codes that realize functionalities of the embodiments. In this case, a storage medium on which the program codes are recorded is provided to a computer, and a processor included in the computer reads out the program codes stored on the storage medium. In this case, the program codes themselves read out from the storage medium realize the functionalities of the embodiments mentioned before, and the program codes themselves, and the storage medium on which the program codes are stored are included in the present invention. As the storage medium for supplying such program codes, for example, a flexible disc, a CD (Compact Disk)-ROM (read-only memory), a DVD (digital versatile disc)-

ROM, a hard disk, a solid state drive (SSD), an optical disc, a magneto-optical disc, a CD-R, a magnetic tape, a non-volatile memory card, a ROM, or the like is used.

In addition, the program codes to realize the functionalities described in the present embodiments can be implemented by a wide range of programs or script languages such as assemblers, C/C++, perl, Shell, PHP, Java (registered trademark), or Python, for example.

In the embodiments mentioned above, depicted control lines and information lines are ones that are considered to be necessary for explanation, and all control lines and information lines that are necessary for products are not necessarily depicted. All configurations may be connected mutually.

What is claimed is:

1. A storage system comprising:
a processor; and
a plurality of physical storage drives that are each respectively housed in one of a plurality of drive enclosures, wherein the processor
configures a virtual chunk with k (k is an integer equal to or larger than two) virtual parcels including a virtual parcel having user data and a respective virtual parcel having element data that is redundant data for repairing the user data, and
stores the virtual parcels included in a same virtual chunk by mapping the virtual parcels in storage areas of k of mutually different physical storage drives among N (k<N) of the plurality of physical storage drives,
maps the virtual parcels such that a maximum value of a numbers of the virtual parcels mapped to particular physical storage drive housed in a same drive enclosure among the plurality of drive enclosures is equal to or smaller than p/r, where redundancy of the virtual chunk is p, and a number of drive enclosures among the plurality of drive enclosures that are able to be active even if a failure occurs is r (r≤p).

2. The storage system according to claim 1, wherein the processor further:
maps the virtual parcels such that numbers of the virtual parcels mapped to the particular physical storage drive to be housed in the same drive enclosure among the plurality of drive enclosures are a single number.

3. The storage system according to claim 1, wherein
a number of pieces of the user data and a number of pieces of the redundant data that are included in a single virtual chunk,
a maximum number of the drive enclosures that includes a number of drive enclosures scheduled to be added, and
failure tolerance of the drive enclosures are prespecified at a time of initial construction of the storage system.

4. The storage system according to claim 3, wherein,
when the number of the pieces of the user data included in the single virtual chunk is d p, additional physical storage drives are added in units of (d+p)r/p physical storage drives.

5. The storage system according to claim 3, wherein,
when the number of the pieces of the user data included in the single virtual chunk is d, physical storage drives are added such that a number of the plurality of physical storage drives is an integer multiple of (d+p)r/p.

6. The storage system according to claim 1, wherein,
in a case in which a new virtual chunk is to be configured, the processor
selects respective virtual parcels, and moves mapping of the respective virtual parcels between the plurality of physical storage drives,
moves the respective virtual parcels included in the same virtual chunk to the k mutually different physical storage drives among the N (k<N) physical storage drives when the respective virtual parcels are moved between the plurality of physical storage drives, and
further moves the respective virtual parcels such that the maximum value of the numbers of the respective virtual parcels mapped to a particular physical storage drive to be housed in a same drive among the plurality of drive enclosures is equal to or smaller than a predetermined value.

7. The storage system according to claim 1, wherein
virtual stripe rows include the user data and the element data that is redundant data for repairing the user data, the user data and the element data being stripes included in mutually separate virtual parcels in the same virtual chunk,
the virtual chunk includes B (B is a positive integer) virtual stripe rows, and
each virtual parcel includes B stripes belonging to mutually different virtual stripe rows.

8. The storage system according to claim 7, wherein
a virtual parity group includes k virtual storage drives,
a first virtual storage drive among the k virtual storage drives, wherein the first virtual storage drive stores the virtual parcel, and the k virtual storage drives store the virtual chunk,
each of the k virtual storage drives is mapped to a respective storage drive of the plurality of physical storage drives,
a Vchunk cycle group includes E (E is a positive integer) virtual parity groups that are included in a Vchunk cycle, and
a plurality of the virtual parity groups are cyclically allocated to particular physical storage drives in the Vchunk cycle group.

9. A storage administration method, the method comprising
configuring, by a processor, a virtual chunk with k (k is an integer equal to or larger than two) virtual parcels including a virtual parcel having user data and a virtual parcel having element data that is redundant data for repairing user data;
storing, by the processor, the virtual parcels included in a same virtual chunk by mapping the virtual parcels in storage areas of k of mutually different physical storage drives among N (k<N) of a plurality of physical storage drives; and
mapping the virtual parcels such that a maximum value of a numbers of the virtual parcels mapped to particular physical storage drives housed in a same drive enclosure among a plurality of drive enclosures is equal to or smaller than p/r, where redundancy of the virtual chunk is p, and a number of drive enclosures among the plurality of drive enclosures that are able to be active even if a failure occurs is r (r≤p).

* * * * *